United States Patent
Sugai

(10) Patent No.: US 9,406,156 B2
(45) Date of Patent: Aug. 2, 2016

(54) APPARATUS FOR CONTROLLING ARRANGEMENT OF EACH IMAGE WHEN ARRANGING ONE OR MORE IMAGES, AND METHOD THEREOF

(71) Applicant: CANON KABUSHIKI KAISHA, Tokyo (JP)

(72) Inventor: Yousuke Sugai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 13/933,627

(22) Filed: Jul. 2, 2013

(65) Prior Publication Data

US 2014/0010461 A1      Jan. 9, 2014

(30) Foreign Application Priority Data

Jul. 9, 2012   (JP) ................................. 2012-153672

(51) Int. Cl.
G06K 9/52       (2006.01)
G06T 11/60      (2006.01)

(52) U.S. Cl.
CPC ..................................... *G06T 11/60* (2013.01)

(58) Field of Classification Search
CPC .. G06F 17/30274; G06F 3/04842; G06K 9/32
USPC .................. 382/206, 305, 100, 154, 190, 201
See application file for complete search history.

(56) References Cited

U.S. PATENT DOCUMENTS

| | | | |
|---|---|---|---|
| 2011/0026773 A1* | 2/2011 | Sumitomo et al. | 382/106 |
| 2012/0148121 A1* | 6/2012 | Ryuto et al. | 382/118 |
| 2013/0006525 A1* | 1/2013 | Stroila | 701/434 |

FOREIGN PATENT DOCUMENTS

JP        2010-134777 A       6/2010

* cited by examiner

*Primary Examiner* — Manuchehr Rahmjoo
(74) *Attorney, Agent, or Firm* — Canon USA, Inc. IP Division

(57) ABSTRACT

An apparatus includes an association unit, a setting unit, and an arrangement unit. The association unit associates an image with a display region reference point through an image reference point of the image. Here, a number of display region reference points disposed in a display region is equal to or more than the number of images to be arranged in the display region. The setting unit sets, in the display region and for each image, an image reference point arrangement region based on a size of the image associated with the display region reference point and based on a position of the display region reference point associated with the image. The arrangement unit arranges each image in the display region by positioning the image reference point of the image within the image reference point arrangement region associated with the image.

22 Claims, 21 Drawing Sheets

FIG.4A
IMAGE DATA OBJECT FOR ARRANGEMENT

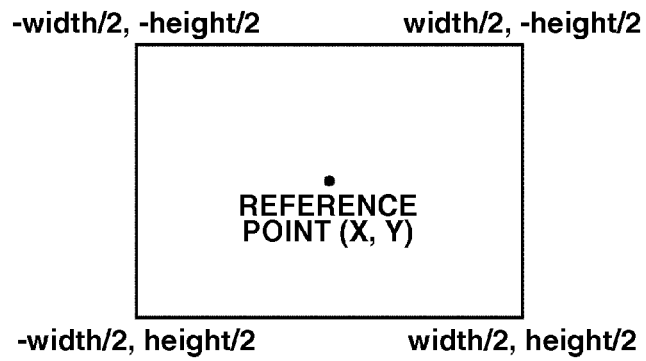

FIG.4B
DATA CONTENT OF IMAGE DATA OBJECT FOR ARRANGEMENT

| ID | NAME | CONTENT |
|---|---|---|
| 401 | "X" COORDINATE OF IMAGE REFERENCE POINT | COORDINATE ON COLLAGE REGION |
| 402 | "Y" COORDINATE OF IMAGE REFERENCE POINT | COORDINATE ON COLLAGE REGION |
| 403 | WIDTH WHEN OBJECT IS ARRANGED | SIZE ON COLLAGE REGION |
| 404 | HEIGHT WHEN OBJECT IS ARRANGED | SIZE ON COLLAGE REGION |
| 405 | "X" COORDINATE OF IMAGE REFERENCE POINT IN OBJECT | COORDINATE OF IMAGE DATA FROM LEFT EDGE |
| 406 | "Y" COORDINATE OF IMAGE REFERENCE POINT IN OBJECT | COORDINATE OF IMAGE DATA FROM TOP EDGE |
| 407 | IMAGE ROTATIONAL ANGLE | ROTATIONAL ANGLE ABOUT IMAGE REFERENCE POINT |
| 408 | IMAGE DATA | DATA INDICATING ACTUAL IMAGE |

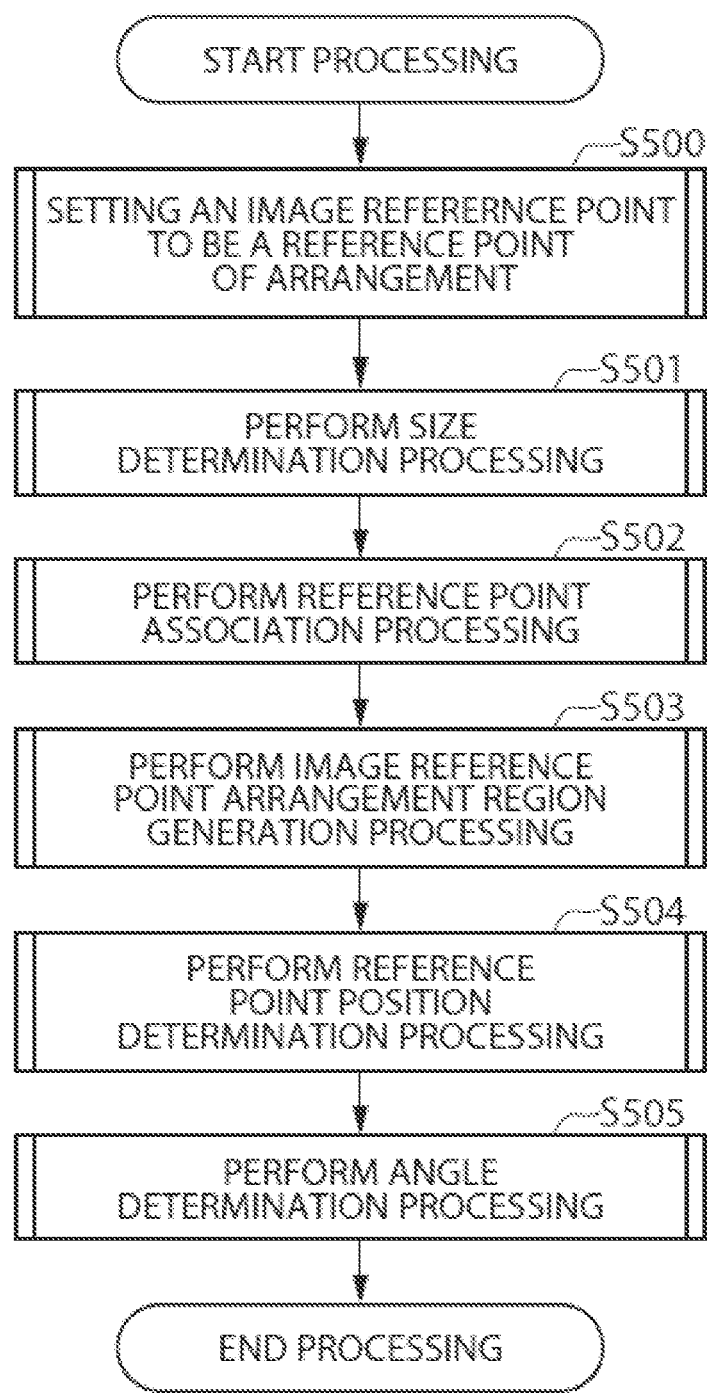

FIG.6

LL: WIDTH & HEIGHT: 70%
L: WIDTH & HEIGHT: 50%
M: WIDTH & HEIGHT: 40%
S: WIDTH & HEIGHT: 33%
SS: WIDTH & HEIGHT: 25%

| THE NUMBER OF IMAGES | PATTERN NAME | LL | L | M | S | SS |
|---|---|---|---|---|---|---|
| 1 | A | 1 | | | | |
|   | B | | 1 | | | |
| 2 | A | | 1 | 1 | | |
|   | B | | 2 | | | |
| 3 | A | | 1 | 1 | 1 | |
|   | B | | 2 | 1 | | |
|   | C | | | 3 | | |
|   | D | | 1 | 2 | | |
| 4 | A | | 1 | 2 | 1 | |
|   | B | | | 4 | | |
|   | C | | | 2 | 2 | |
|   | D | | | 1 | 2 | 1 |
| 5 | A | | | 2 | 3 | |
|   | B | | | 2 | 1 | 2 |
|   | C | | | | 5 | |
|   | D | | | 1 | 2 | 2 |
|   | E | | | | 3 | 2 |

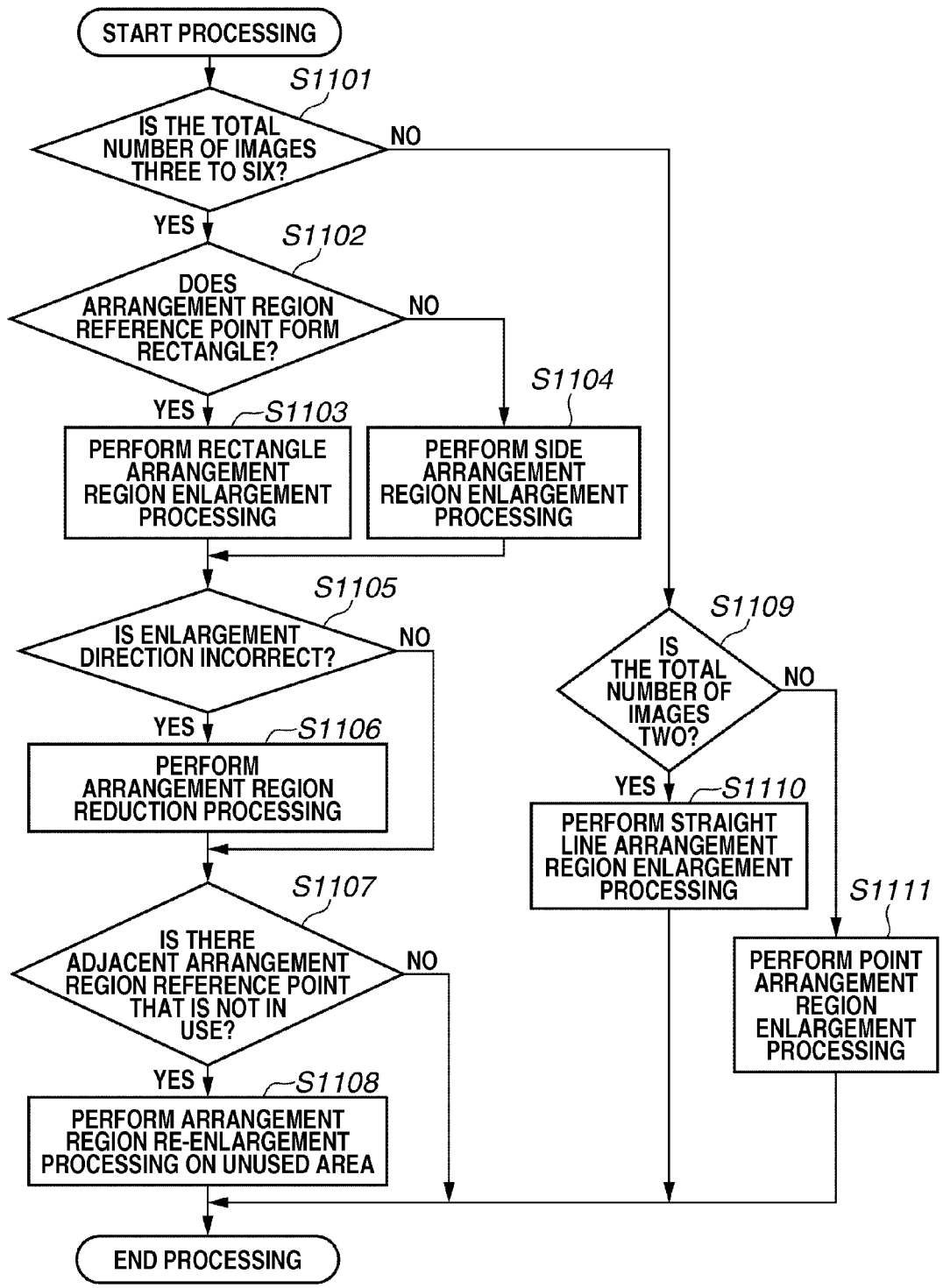

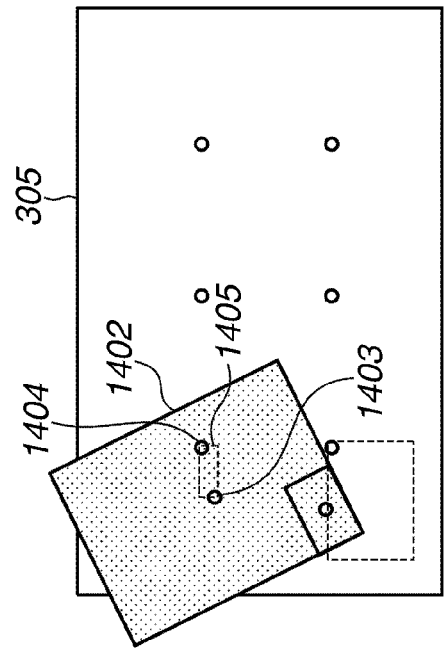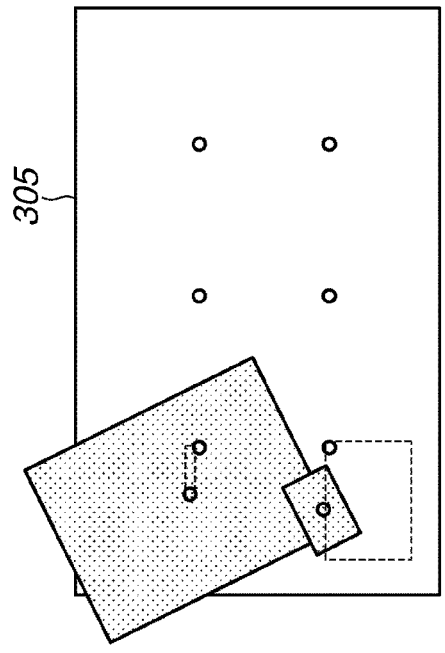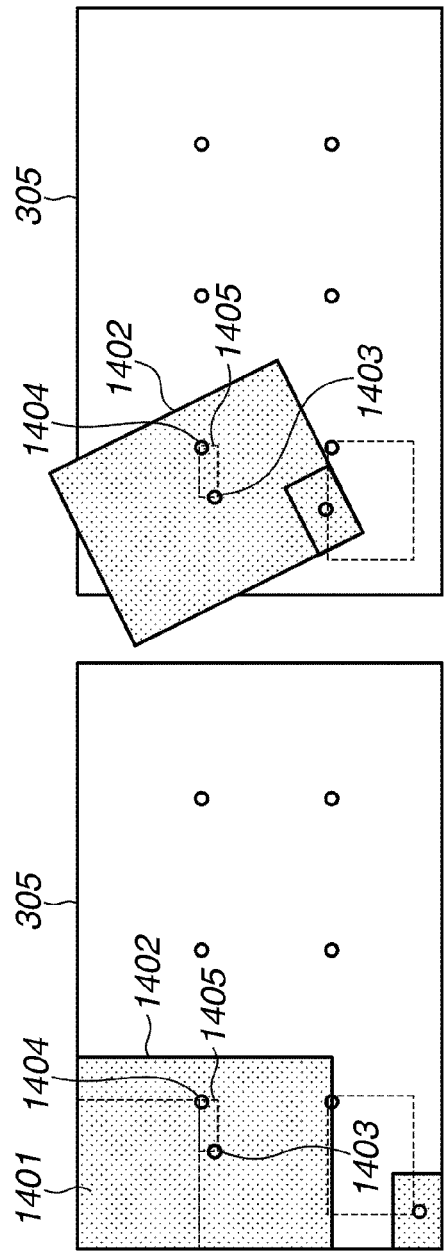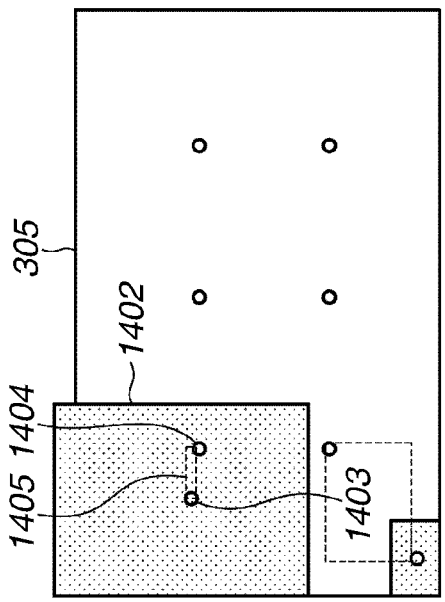

APPARATUS FOR CONTROLLING ARRANGEMENT OF EACH IMAGE WHEN ARRANGING ONE OR MORE IMAGES, AND METHOD THEREOF

BACKGROUND OF THE INVENTION

1. Field of the Invention

The present invention relates to an apparatus for controlling arrangement of each image when one or more images are arranged, and method thereof.

2. Description of the Related Art

Conventionally, an image generation application (hereinafter also referred to as a "collage application") has been known that combines pictures, photos, and texts with one another to generate a collage. Such a collage application that is provided with a function in which a user can arbitrarily move and arrange image data is known. However, since it takes time to generate a collage, even if the collage application is used, generating a collage is difficult.

Thus, Japanese Patent Application Laid-Open No. 2010-134777 discusses a patterning method including a table in which a place where a photo is to be arranged in a collage region is originally patterned and then automatically applying an image to the predetermined place.

Japanese Patent Application Laid-Open No. 2010-134777 has a problem in which, since the prepared pattern is used, only low freedom is allowed for the arrangement.

SUMMARY OF THE INVENTION

According to an aspect of the present invention, there are provided an apparatus that can solve conventional technical problems, and a method. Further, according to another aspect of the present invention, there are provided an apparatus that can improve freedom for an image arrangement position and the method.

According to an aspect of the present invention, an apparatus includes an association unit configured to associate an image with a display region reference point through an image reference point of the image, wherein a number of display region reference points disposed in a display region is equal to or more than the number of images to be arranged in the display region, a setting unit configured to set, in the display region and for each image, an image reference point arrangement region based on a size of the image associated with the display region reference point and based on a position of the display region reference point associated with the image, an arrangement unit configured to arrange each image in the display region by positioning the image reference point of the image within the image reference point arrangement region associated with the image, and at least one processor, wherein the at least one processor implements the association unit, the setting unit, and the arrangement unit.

Further features of the present invention will become apparent from the following description of exemplary embodiments (with reference to the attached drawings).

BRIEF DESCRIPTION OF THE DRAWINGS

FIGS. 4A and 4B illustrate an image object according to the first exemplary embodiment.

FIG. 5 is a flowchart illustrating determination processing of image object data according to the first exemplary embodiment.

FIG. 6 is a size determination table used for size determination processing according to the first exemplary embodiment.

FIG. 11 is a flowchart for determining an image reference point arrangement region according to the first exemplary embodiment.

FIGS. 14A, 14B, 14C, and 14D illustrate arrangement region reduction processing according to the first exemplary embodiment.

DESCRIPTION OF THE EMBODIMENTS

Exemplary embodiments of the present invention will be described in detail below with reference to attached drawings. The exemplary embodiments described below are in no way intended to limit the present invention according to the scope of the claims and, further, all combinations of the features described in the present exemplary embodiments are not always essential for solution methods of the present invention.

Figure 1:
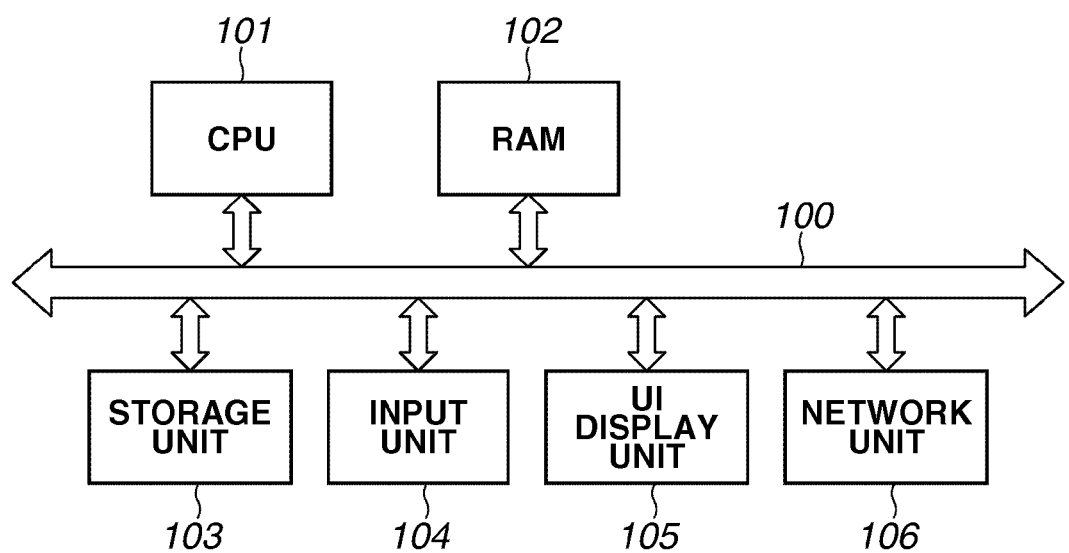
FIG. 1 is a block diagram illustrating an image arrangement system according to a first exemplary embodiment of the present invention.

FIG. 1 is a block diagram illustrating an image arrangement control system operated by an application program (collage application) according to a first exemplary embodiment.

An image arrangement control system illustrated in FIG. 1 includes a central processing unit (CPU) 101 controlling an entire image arrangement control apparatus, a random access memory (RAM) 102 providing a work area of the CPU 101, and a storage unit 103 storing an application program and image data of photographs. Further, the image arrangement control system includes an input unit 104 via which a user can input a command, a user interface (UI) display unit 105 for displaying a screen, a network unit 106 for communicating with other devices via a network, and a main bus 100. The CPU 101, the RAM 102, the storage unit 103, the input unit 104, the UI display unit 105, and the network unit 106 are connected with one another via the main bus 100. The CUP 101 loads a program stored in a hard disk and so on to a RAM 102 and runs the program on the RAM 102, thereby controlling of the entire image arrangement control apparatus according to the present embodiment.

The storage unit 103 includes a hard disk drive (HDD) and a non-volatile RAM (NVRAM). When, for example, the image arrangement control system is connected to the internet via the network unit 106, the storage unit 103 can store new image data and its information downloaded over the internet.

The input unit 104 is a general input device such as a mouse and a keyboard operated by a user to operate an application.

According to the present exemplary embodiment, the input unit 104 and the UI display unit 105 are separately provided, however, they may be formed as a touch panel having both functions.

The image arrangement control system can be realized by installing a collage application into a versatile personal computer (PC) or a smart phone.

A method for generating a collage image by the image arrangement control system illustrated in FIG. 1 will be described below with reference to FIGS. 2 to 17.

Figure 2:
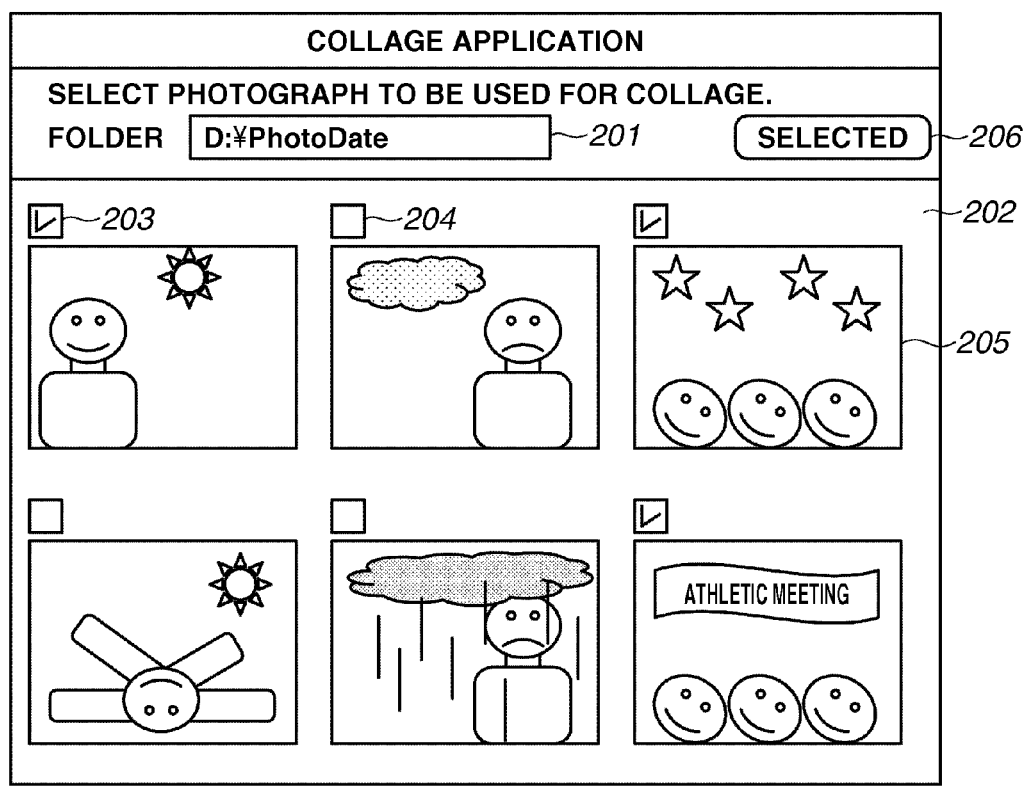
FIG. 2 illustrates an image data selection screen for selecting an image according to the first exemplary embodiment.

FIG. 2 illustrates an image data selection screen for selecting an image to be used in the collage image by the collage application according to the first exemplary embodiment.

When "generation" of the collage image is selected from a menu on a basic screen of the collage application, the image data selection screen illustrated in FIG. 2 is displayed on the UI display unit 105 illustrated in FIG. 1. The image data selection screen includes a path input unit 201, an image display unit 202, and an image data selection completion button 206.

The path input unit 201 is used to input a location where the image data is stored in the storage unit 103. When the location where the image data is stored is input via the path input unit 201, the image data is obtained from the input location, and then, the obtained image data is displayed on the image display unit 202.

The image display unit 202 illustrated in FIG. 2 displays a plurality of images, each of which is provided with a check box. Each of check boxes 203 and 204 is used to select the image to be used for the collage by the user. The user clicks or touches each check box via the input unit 104 to apply a check mark in the check box, and then the image to be used for the collage is selected.

The image display unit 202 displays image data 205 based on the path input unit 201 in a predetermined size. The image data includes a small image having 130 pixels×130 pixels, a large image having 2,048 pixels×1,600 pixels, and various types of images smaller than the small image and larger than the large image. However, as described above, the image data selection screen according to the present exemplary embodiment displays the image data in any size as the image data in a same size.

The image data selection completion button 206 completes selection of the image. The image data selection completion button 206 is pressed to determine that the image (e.g., photograph), with its check box checked at that time, is used for the collage image, and then the screen shifts to a collage operation screen for generating the collage image.

Figure 3:
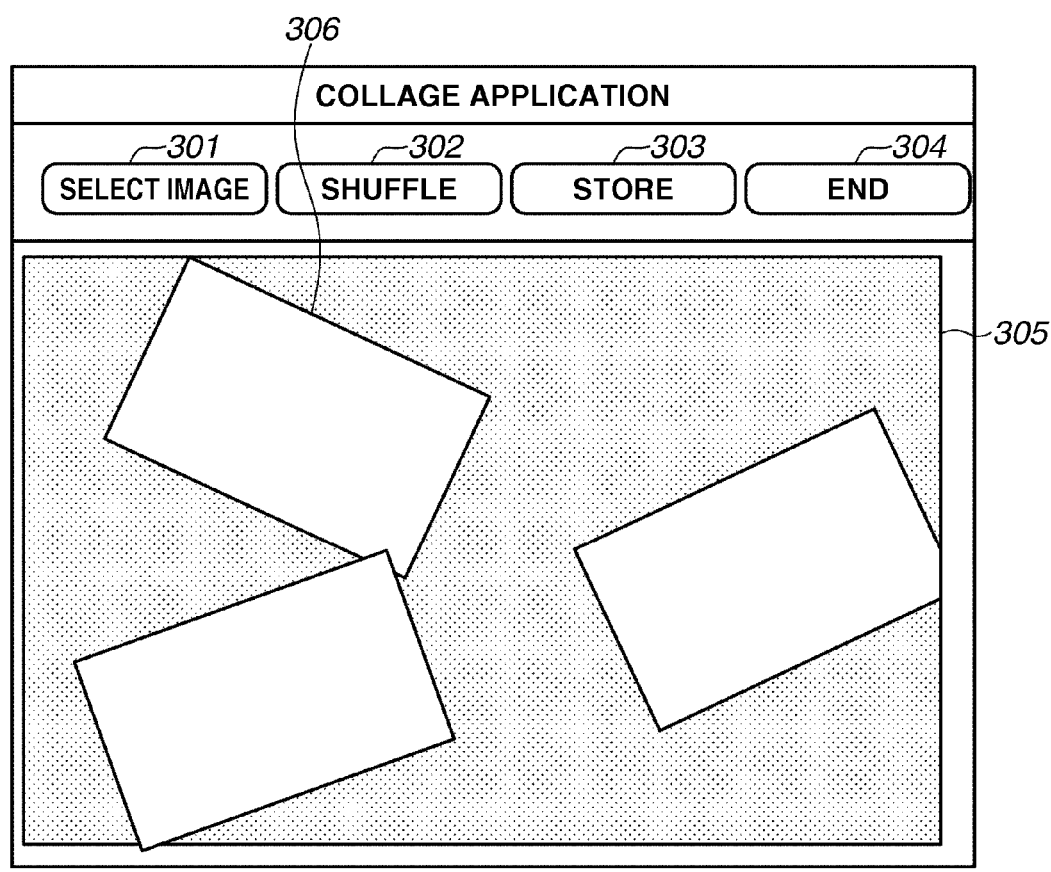
FIG. 3 illustrates a collage operation screen according to the first exemplary embodiment.

FIG. 3 illustrates a collage operation screen for generating the collage image by the collage application according to the first exemplary embodiment.

As described above, the image data selection screen of FIG. 2 shifts to the collage operation screen illustrated in FIG. 3, which is displayed on the UI display unit 105 illustrated in FIG. 1. The collage operation screen includes an image selection button 301, a shuffle button 302, a storage button 303, an end button 304, and a collage region 305.

The image selection button 301 has a function for shifting (returning) the screen of FIG. 3 to the image data selection screen illustrated in FIG. 2 when the image is to be added. The shuffle button 302 has a function for shuffling the images. The storage button 303 has a function for storing the generated collage image in the storage unit 103. The end button 304 has a function for ending the collage operation screen to display the basic screen of the collage application.

The collage region 305 shows the collage image itself, where the image data can be displayed and the image object 306 to be operated can be arranged. In other words, the collage region 305 is an arrangement region of the image object 306. The image object 306 is allowed to run over, or extend outside of, the collage region 305. According to the present exemplary embodiment, when the image object 306 extends outside of the collage region 305, the portion of the image object 306 extending outside of the collage region 305 is not rendered.

The image object 306 will be described below with reference to FIGS. 4A and 4B.

FIG. 4A illustrates an image object 306 for displaying the image data. A height (vertical width) and a horizontal width of the image object 306 have values determined by image size determination processing described below. An object image reference point 405/406 is set for the image object 306. By specifying a coordinate of the object image reference point 405/406, the object image reference point 405/406 can be used to arrange the image object 306 in the collage region 305. According to the present exemplary embodiment, a center (centroid) of the image object 306 is defined as the object image reference point 405/406, and an X coordinate 405 and a Y coordinate 406 of the object image reference point 405/406 are specified in the image object, where the object image reference point 405/406 of the image object is arranged at a predetermined position in the collage region 305.

FIG. 4B is an example of data retained by the image object. The image object 306 illustrated in FIG. 4A retains, for example, data as illustrated in FIG. 4B. Identification (ID) 401 to ID 408 specify a type of the data of the image object 306, and "name" illustrated in FIG. 4B indicates the name set for each data.

The data specified by the ID 401 and the data specified by the ID 402 are coordinate data that locate the object image reference point 401/402 in the collage region 305, which include the data of the X coordinate 401 of the collage region image reference point 401/402 and the data of the Y coordinate 402 thereof respectively. The data specified by the ID 403 and the data specified by the ID 404 are respectively the data of the horizontal width and the data of the vertical width (height) when the image object 306 is arranged in the collage region 305. Further, the data specified by the ID 405 and the data specified by the ID 406 are the coordinate data indicating where the object image reference point 405/406 is located in the image object 306. According to the present exemplary embodiment, the object image reference point 405/406 is defined as the center of the image. Therefore, the data of the X coordinate 405 of the object image reference point 405/406 in the object specified by the ID 405 has a value half as large as that of the data specified by the ID 403. Further, the data of the Y coordinate 406 of the object image reference point 405/406 in the object specified by the ID 406 has a value half as large as that of the data specified by the ID 404. By comparison, FIGS. 18A-18B and 19A-19B, image reference points 1810, 1811, 1812, and FIG. 21 image reference point 2103 are set based on criteria such as a center of a face or decorative frame. Regarding the ID 407, the data of a rotation angle of the image specified by the ID 407 is the data of the angle for rotating the image object 306 about the object image reference point 405/406. The image data specified by the ID 408 indicates an actual image.

The data specified by the ID 401 to the ID 407 are given to the image data of the ID 408 so that the image data of the ID 408 is displayed in the collage region 305 at a predetermined position 401/402, in a predetermined size 403/404, and at a predetermined angle 407. More specifically, the position of the collage region image reference point 401/402 can be securely determined according to the coordinate data specified by the ID 401 and the ID 402. Further, based on the relative relationship between the data specified by the ID 403 to the ID 406 and the data specified by the ID 401 and the ID 402, a display position of the image object 306, when it is not rotated, can be calculated. Finally, based on the angle specified by the ID 407, the image object 306 can be rotated and displayed in the collage region 305. According to the present exemplary embodiment, the data of the ID 401 to the data of the ID 407 are randomly determined to shuffle the images. As described in more detail below, using random numbers such as pseudorandom numbers in steps S503 to S505, S801, S802, S1004, S1008, and S1009 below determine random arrangement and the arrangement pattern. Further, according to the present exemplary embodiment, by pressing the shuffle button 302 illustrated in FIG. 3, the image object 306 can be shuffled.

Determination processing of the image object data, in other words, an arrangement method of the image object in the collage region will be described with reference to FIG. 5. FIG. 5 is a flowchart illustrating an image object data determination processing for randomly determining the data specified by the ID 401 to the ID 407 described above. The processing is performed such that a program stored in the hard disk and so on is loaded to the RAM 102 to be executed by the CPU 101.

Figure 21:
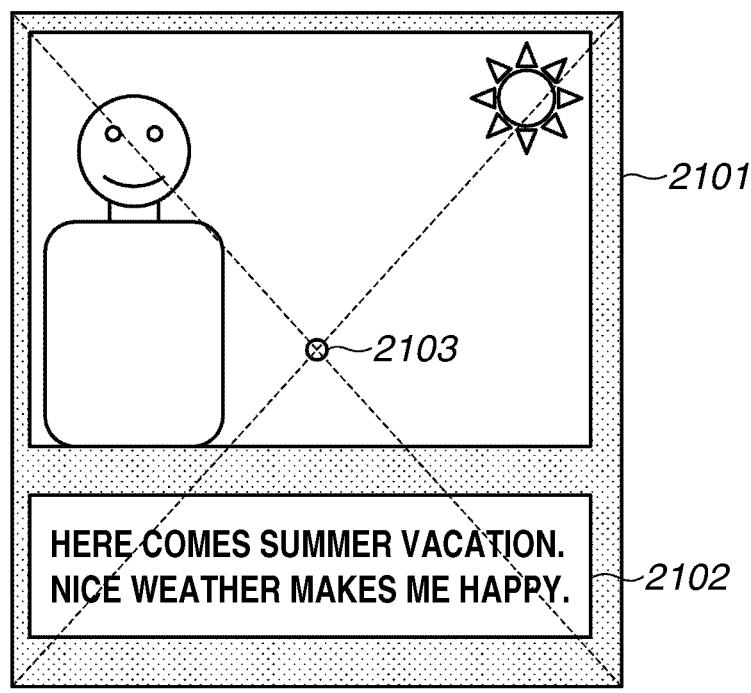
FIG. 21 illustrates an image reference point determination method according to another exemplary embodiment.

After the image of FIG. 2 to be used for the collage has been selected on the screen illustrated in FIG. 2, an image reference point is set at step S500 to be a reference point of arrangement. According to the present exemplary embodiment, a center (centroid) of each image selected is set as the image reference point (see, e.g., reference point (x, y) in FIG. 4A) By setting the center of the image as the image reference point, desired portion of the image can be securely disposed within the collage region 305. The image reference point may be set at locations other than the image center. For example, as illustrated in FIGS. 18A-18B and 19A-19B, the center of the face region is defined as the image reference point and, as illustrated in FIG. 21, a center 2103 of a region including the decorative frame 2101 is defined as the image reference point.

The size determination processing of the image in the collage region 305 is performed in step S501. Here, the size of each image is determined from large to small. In step S502, reference point association processing is performed in image size order, beginning with the image having a larger size determined in step S501 to an image having smaller size. The reference point association processing is processing for associating an arrangement reference point (region reference point) in the collage region 305 with the image reference point of each image set in step S500. In other words, the reference point association processing is the processing for associating each image and the region reference point. The region reference point, which will be described below in connection with FIG. 9, refers to a point of reference when the image reference point of each image is arranged within a region (referred to as an image reference point arrangement region) in the collage region 305. At that time, when two or more images are arranged, the position of the image to be arranged after the second images will affect the arrangement of other images that already have been arranged. According to the present exemplary embodiment, since the images are arranged in image size order, from the largest image to the smallest image, the arrangement of other images in the collage region 305 is affected by a position where the largest image is arranged.

After the image reference points of all images are each associated with the region reference points in step S502, then, in step S503, generation processing of an image reference point arrangement region is performed in image size order, from the image having a larger size determined in step S501 to an image having a smaller size. The generation processing of the image reference point arrangement region, which will be described below, is a process to determine a region within which an image reference point can be arranged. The image reference point arrangement region is based on the size of an image, the position of the region reference point 401/402 in the arrangement region, and the image reference point 405/406 as associated with its region reference point 401/402.

After the image reference point arrangement region has been generated in step S503 for all images, then, in step S504, the determination processing of the image reference point position 401/402 of each image is performed. The determination processing of the image reference point position 401/402 is processing for determining the region position 401/402 of the image reference point 405/406 for any of the coordinates in the image reference point arrangement region. In other words, the determination processing of the image reference point position 401/402 is the processing for arranging the image reference point 405/406 at a location 401/402 within the image reference point arrangement region. The position 401/402 of the image reference point 405/406 in the image reference point arrangement region is randomly determined using random numbers. The position of the image reference point is randomly determined to improve the freedom of the collage image.

Finally, in step S505, angle determination processing for determining an angle 407 of the image is performed. With the processing of FIG. 5, all values of the data specified by the IDs 401 to 407 in FIG. 4B are determined.

Recall that the size determination processing of the image in the collage region 305 is performed in step S501. The size determination processing of step S501 will be described with reference to FIGS. 6 to 8.

FIG. 6 illustrates a size determination table used in the size determination processing of step S501. As illustrated in FIG. 6, size patterns in one or more sizes LL, L, M, S, and SS are prepared in association with the number of images selected to be used for the collage in collage region 305. The size patterns may be stored, in the RAM 102 for example, according to the number of the images, or may be obtained from an outside via the internet. The size determination processing of step S501 randomly determines the size pattern from among the size patterns described above. For example, when a user selects three images on the screen illustrated in FIG. 2, the size determination processing of step S501 randomly selects any one size pattern from four types of size patterns A, B, C, and D, where the selected size pattern is to determine the size LL, L, M, S, and SS. When three images are included and the size pattern D is selected, one ("1") of the images is sized based on an L size reference and the remaining two ("2") images are sized based on an M size reference. More specifically, the size of 50% of the collage region 305 is the size reference for the horizontal width and height of the one image and the size of 40% of the collage region 305 is the size reference for the horizontal width and height of the remaining two images. The size reference is determined as described above, however, the size reference is not always adopted as the size of the image when the collage is generated. For example, when an aspect ratio of the collage region 305 is different from that of the image, the size is determined to maintain the aspect ratio of the image when the collage is generated. This is performed so that the image is not deteriorated.

Figure 7:
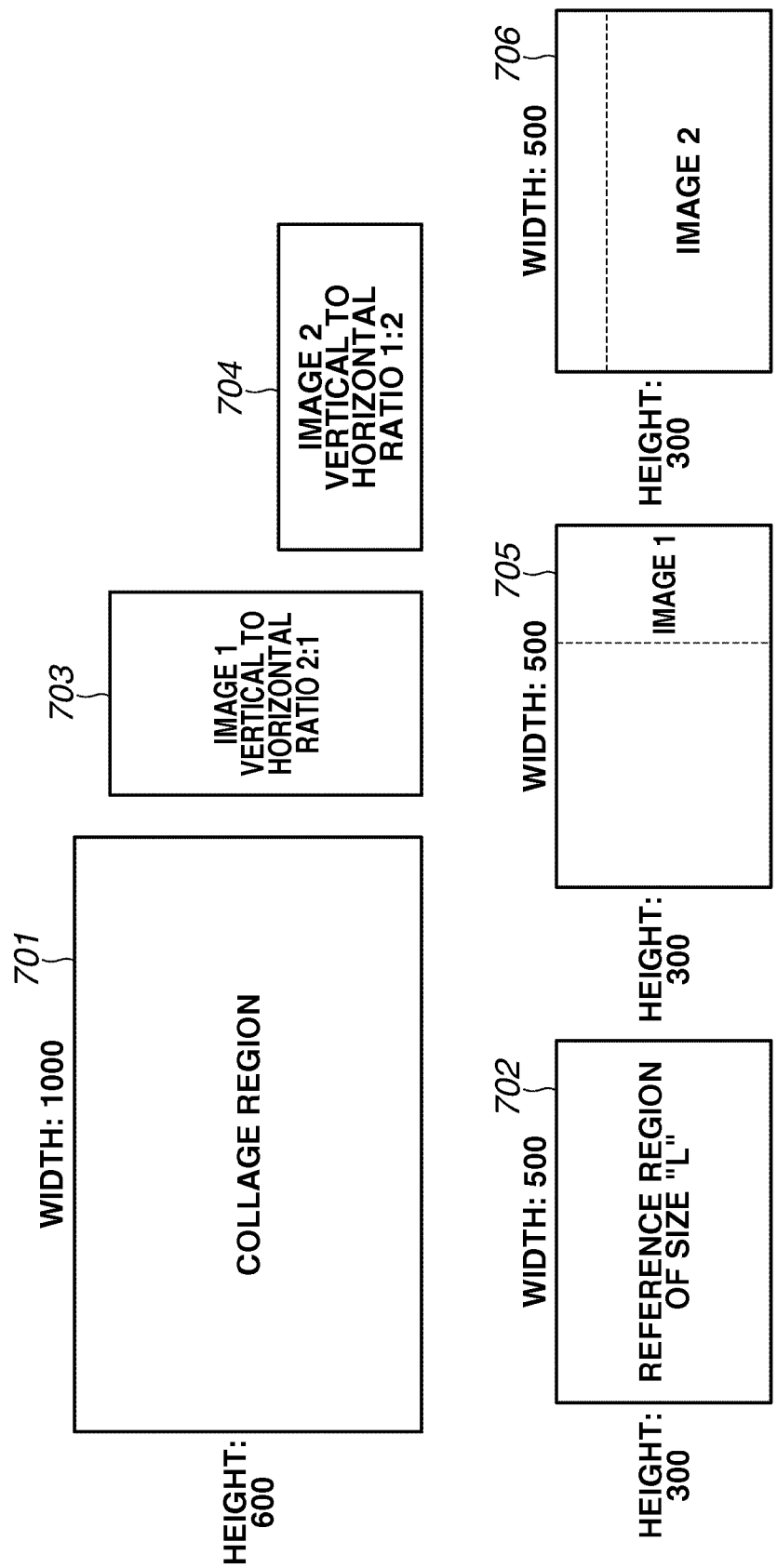
FIG. 7 illustrates final image sizes determined based on a size reference according to the first exemplary embodiment.

FIG. 7 illustrates how final image sizes are determined based on the size reference described with reference to FIG. 6. When the horizontal width of a collage region 701 is 1,000 and the height thereof is 600, the L size in the size reference table illustrated in FIG. 6 indicates that the horizontal width is 50% of the collage region 701 and the height is 50% thereof. Therefore, according to the size reference, the horizontal width of a rectangle or reference region 702 of size "L" is 500 and the height thereof is 300.

When the aspect ratio of an image is the same as that of the collage region 701, the size of the image is determined to equal the size of the reference region 702, which has the horizontal width of 500 and the height of 300. However, when the aspect ratio of the image is 2:1, as it is for the image 703, and is not the same as the aspect ratio of the collage region 701, which is 3:5, the aspect ratio of the image 703 is to be maintained when placed in the reference region 702 of size "L". Here, the maximum size of the image 1 in reference region 705 is determined without changing a direction of the image 703. In other words, when the image 703 is inscribed in the reference region 702 of size "L", the size of the image 703 changes to a horizontal width 150 and a height 300, which is determined as the final size of the image 703. When the aspect ratio of the image is 1:2, as it is for the image 704, and is not the same as the aspect ratio of the collage region 701, the aspect ratio of the image 704 is to be maintained when placed in the reference region 702 of size "L". Here, the maximum size of the image 2 in the reference region 706 is determined without changing a direction of the image 704. In other words, when the image 704 is inscribed in the reference region 702 of size "L", the size of the image 704 changes to a horizontal width 500 and a height 250, which is determined as the final size of the image 704.

Figure 8:
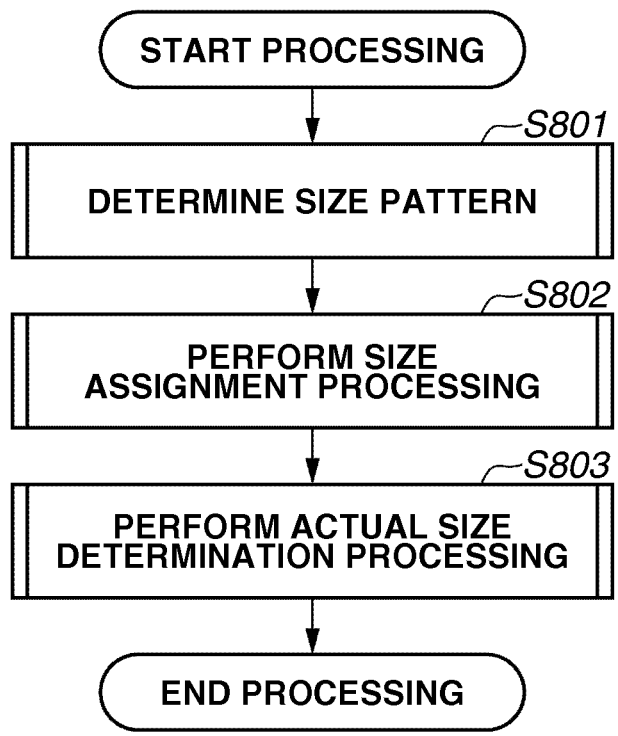
FIG. 8 is a flowchart illustrating size determination processing according to the first exemplary embodiment.

FIG. 8 is a flowchart of the size determination processing of step S501 according to the present exemplary embodiment. The processing is performed such that a program stored in the hard disk and so on is loaded to the RAM 102 to be executed by the CPU 101.

In step S801, determination processing of a size pattern is performed. More specifically, based on the size reference determination table illustrated in FIG. 6, the size pattern is determined according to the number of the selected images. At this time, the size pattern is randomly determined using random numbers. Any of a plurality of size patterns can be selected in the size determination processing to generate collage images having various types of size patterns.

In step S802, size assignment processing is performed. More specifically, the sizes of LL, L, M, S, and SS determined as a predetermined size pattern are randomly assigned to a target image using the random numbers. For example, when three images are included and the size pattern D is randomly selected from pattern names A-D, one ("1") of the images randomly is sized based on an L size reference and the remaining two ("2") images are sized based on an M size reference. According to the present exemplary embodiment, the random size assignment processing does not take an original size of an image into account. If the original size of the image is taken into account, the originally large image is always assigned as the largest image of the size pattern, and thus the collage images to be generated are not well balanced in the size pattern. On the other hand, the size assignment processing according to the present exemplary embodiment can generate the collage images of various size patterns. In other words, the collage image to be generated has the higher freedom.

In step S803, actual size determination processing for determining an actual image size is performed based on the sizes of L, M, S, and the like assigned to the images in step S802. More specifically, based on the size reference determination table illustrated in FIG. 6, the reference region 702 acquired by reducing the height and horizontal width of the collage region 701 (according to the present exemplary embodiment, anywhere from 70% to 25% reduction) is calculated and defined as the size reference. Subsequently, the aspect ratio of the collage region 701, acquired by calculation, is compared with the aspect ratio of the target image, such as image 703 or 704. When the target image is horizontally longer than the collage region 701, in other words, when the target image is smaller than the collage region 701 in the aspect ratio, the horizontal width of the size reference is set as that of the image object, and the height is calculated by multiplying the horizontal width of the image object by the aspect ratio of the image. On the other hand, when the target image is vertically longer than the collage region 701, the height of the size reference is set as that of the image object, and the horizontal width is calculated by dividing the height of the image object by the aspect ratio of the image. The size pattern in the size reference determination table illustrated in FIG. 6 is adjusted so that, when the images are arranged, an entire area of the images accounts for 70% of the collage region 701 or less. As described above, by setting the entire area of the images to be a predetermined ratio of the area of the collage region 701 or less, all the images are set to have the same size as the size reference or less than the size reference. Thus, cases where the collage region 701 is filled with the images or the images are overlapped with each other can be reduced.

The reference point association processing of step S502 will be described below with reference to FIGS. 9 and 10.

Figure 9:
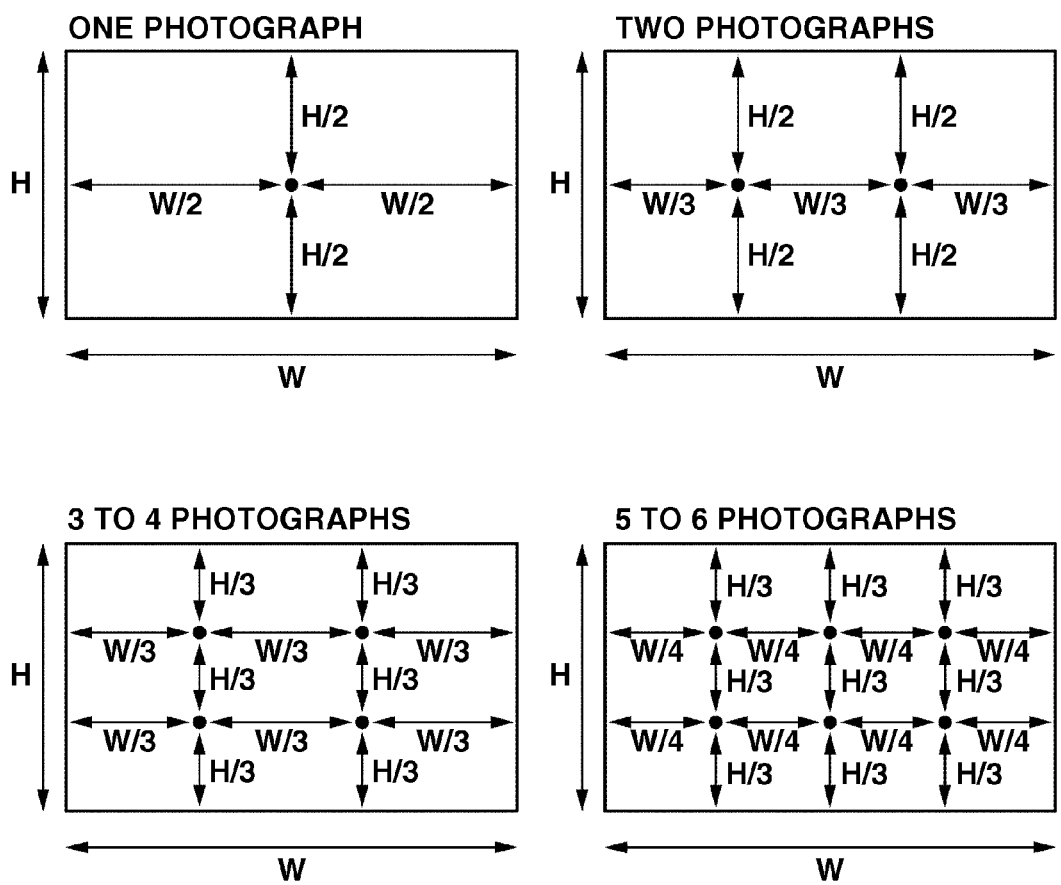
FIG. 9 illustrates an example of arrangement patterns of region reference points used in reference point association processing.

FIG. 9 illustrates an example of arrangement patterns of region reference points used in the reference point association processing. FIG. 9 indicates the number of region reference points and their positions in the collage region 305. This region reference point is used as a reference point when the image is arranged. The number of region reference points is determined according to the number of the images to be arranged in the collage region 305. Further, the region reference points are disposed at an equal interval in the collage region 305. As illustrated in FIG. 9, when one image is arranged, it is arranged at a center of the collage region 305. In other words, when one image is arranged, the region reference point is disposed at a position where the height is ½ of the collage region 305 and the horizontal length is ½ thereof. Further, when two or more images are arranged, the region reference points are disposed at the equal interval. For example, when three or four images are arranged, the region reference points are each disposed at positions where the height is ⅓ of the collage region 305 and the horizontal length is ⅓ of the collage region 305. As described above, by disposing the region reference points at the equal interval, the overlapping of the images can be reduced.

The arrangement pattern of region reference points to be used is uniquely determined depending on the number of the images. At that time, the number of region reference points in the collage region 305 is preferably the same as the number of images or more. When the number of region reference points is more than the number of the images, the freedom of the arrangement of the image is increased. The details will be described below. According to the present exemplary embodiment, as illustrated in FIG. 9, the number of region reference points is one for one image (one photograph), two for two images (two photographs), three or four for three or four images (three or four photographs), and five or six for five or six images (five or six photographs).

The reference point association processing of step S502 assigns a region reference point for each image. In other words, the reference point association processing assigns the image reference point of the image to be arranged for the region reference points. The reference point association processing will be described in detail with reference to FIG. 10.

Figure 10:
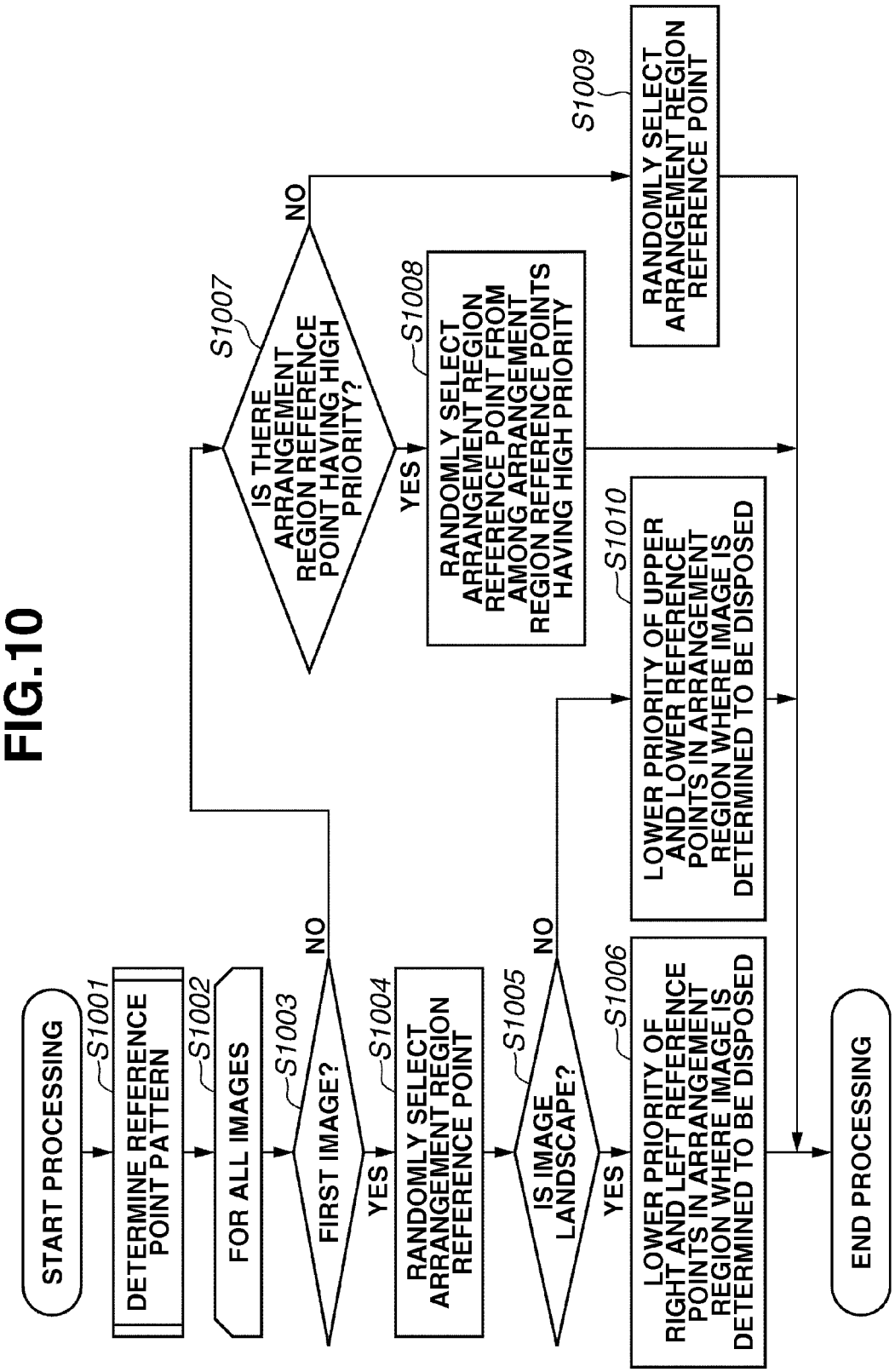
FIG. 10 is a flowchart illustrating reference point association processing according to the first exemplary embodiment.

FIG. 10 is a flowchart illustrating the reference point association processing of step S502. In step S1001, the determination processing of the region reference point arrangement pattern is performed. More specifically, the arrangement pattern of one or more region reference points is uniquely determined, depending on the number of the images selected from the image data selection screen of FIG. 2, based on the region reference point arrangement patterns illustrated in FIG. 9. At that time, priority for associating each image reference point is set equally for all region reference points in the region reference point arrangement pattern.

In step S1002, a region reference point is assigned for each image. In other words, which region reference point is associated with an image reference point of each image is determined. The "association" used herein refers to determination for step S504 disposing (or positioning) the image reference point of the target image within the arrangement-capable region obtained in step 503 based on the region reference point associated with the image reference point in step S502. This processing is performed on all the images in image size order, beginning with the larger image determined by the size determination processing of step S501. From step S1002, the processing proceeds to step S1003.

In step S1003, it is determined whether the image to be arranged in the collage region 305 is the first image to be arranged in the collage region 305. When the image to be arranged is the first image (YES in step S1003), the processing proceeds to step S1004. When the image to be arranged is not the first image (NO in step S1003), the processing proceeds to step S1007.

In step S1004, one region reference point is randomly selected, using random numbers, from among one or more region reference points and then associated with the image reference point of the target image. At that time, the region reference point is randomly selected since the priority of arrangement for each region reference point is set to be equal for the first image. After the selection, the processing proceeds to step S1005.

In step S1005, it is determined whether the image to be arranged is horizontally long. When the image to be arranged is horizontally long (YES in step S1005), the processing proceeds to step S1006. When the image to be arranged is not horizontally long, in other words, when the image is in a square shape or vertically long (NO in step S1005), the processing proceeds to step S1010.

One region reference point is randomly associated with the image reference point of the first image in step S1004. In a case where two or more images are selected to be used for the collage, there will be a number of region reference points that have not been associated with the image reference point of an image. Here, the region reference points not associated may be disposed in at least either one of the right and left of the associated region reference point. In step S1006, when a not-associated region reference point is disposed in a right and left direction of the region reference point associated in step S1004 with the first image, in other words, when the not-associated region reference point is disposed in at least either one of the right and left, the arrangement priority of the not-associated region reference point is lowered in step S1006. By lowering the arrangement priority in the right and left of the horizontally long image, probability of the overlapping of another image with the horizontally long image (or overlapped area) can be reduced.

In step S1010, when the not-associated region reference point is disposed in an upper and lower direction of the region reference point associated with the image, in other words, when the not-associated region reference point is disposed in at least either one of the upper direction and the lower direction, the arrangement priority of the not-associated region reference point is lowered in step S1010. By lowering the arrangement priority in the upper and lower direction of the vertically long image, the probability of the overlapping of another image with the vertically long image (or overlapped area) can be reduced.

As illustrated in FIG. 10 step S1007, it is determined at step S1007 whether there an arrangement region reference point having high priority. In other words, it is determined whether the region reference point having the high arrangement priority is disposed. Here, the "high arrangement priority" used herein refers to the relatively high priority compared with the priorities of other region reference points. For example, when the region reference point having low priority is disposed, the region reference point having normal priority corresponds to the region reference point having the high arrangement priority. When even one region reference point having the high arrangement priority is disposed (YES in step S1007), the processing proceeds to step S1008. When no region reference point having the high arrangement priority is disposed (NO in step S1007), the processing proceeds to step S1009.

In step S1008, one region reference point is randomly selected from among the region reference points having the high arrangement priority using the random numbers, and then associated with the image reference point of the target image.

In step S1009, one region reference point is randomly selected from among remaining region reference points using the random numbers, and then associated with the image reference point of the target image.

The reference point association processing of FIG. 10 according to the present exemplary embodiment is performed on the images in image size order, beginning with the larger image. First, the largest image is arranged at step S1004, and when that first image is horizontally long, the arrangement priority in the right and left of the image is lowered at step S1006. When the image is vertically long, the arrangement priority in the upper and lower is lowered at step S1010. Then, the target image is arranged to the region reference point having the higher arrangement priority in image size order from the larger image. Thus, by the reference point association processing, in the right and left regions of the largest and horizontally long image, the small image is highly possibly arranged. On the other hand, in the upper and lower regions of the largest and vertically long image, the small image is highly possibly arranged. With this arrangement, the probability of the overlapping of the images (or overlapped area) can be reduced.

According to the present exemplary embodiment, when the odd number of the images is prepared, no image may be arranged next to the largest image.

As described above, by the position of the image determined by the reference point association processing of step S502 according to the present exemplary embodiment, the overlapping of the images can be reduced as much as possible. The reference point association processing described above associates a region reference point in the collage region 305 with an image reference point of the image. By only associating the image reference point with the region reference point by the reference point association processing, the image reference point of the image is arranged at a same position each time, and thus the random property may be lowered.

Generation processing of an image reference point arrangement region is performed in image size order in step S503. According to the present exemplary embodiment, the image reference point arrangement region where the region reference point can be disposed is set. The image reference point arrangement region refers to a region within which the image reference point may be disposed, and is determined based on the region reference point in the collage region 305 as described below. The image reference point arrangement region defines, in other words, how far from the region reference point the image reference point can be arranged. The image reference point is randomly arranged within the image reference point arrangement region, and thus the image can be rendered at different positions each time the image is shuffled.

FIG. 11 is a flowchart for generating (determining) the image reference point arrangement region at step S503. The processing is performed such that a program stored in the hard disk and so on is loaded to the RAM 102 to be executed by the CPU 101. According to the present exemplary embodiment, the region where the image reference point of the image associated with the arrangement reference point can be arranged is determined based on the size of the image, when the image is arranged in the collage region 305, and a position of the region reference point associated with the image by the association method of FIG. 10.

The image reference point arrangement region can be disposed to form a rectangle when they are connected with one another. In step S1101, it is determined whether a rectangle is formed by connecting, with one another, the region reference points set in the collage region 305. According to the present exemplary embodiment, it may be determined whether four region reference points are disposed in the collage region 305 by determining whether three to six images are arranged in the collage region 305. According to the present exemplary embodiment, as illustrate in FIG. 9, when three to six images are arranged, the region reference points are disposed to form a rectangle when they are connected with one another. When it is determined that three to six images are arranged (YES in step S1101), the processing proceeds to step S1102. When it is determined that three to six images are not arranged (NO in step S1101), the processing proceeds to step S1109.

In step S1102, it is determined whether the region reference point associated with the target image corresponds to any of the four corners of the rectangle in the arrangement pattern table illustrated in FIG. 9. When it is determined that the region reference point corresponds to any of the four corners of the rectangle (YES in step S1102), the processing proceeds to step S1103. When it is determined that the region reference point do not correspond to any of the four corners of the rectangle (NO in step S1102), the processing proceeds to step S1104. As discussed in more detail below, a region defined processing of steps S1103 or step 1104 is defined as a first arrangement region, a region defined processing of step S1106 is defined as a second arrangement region, and a region defined processing of steps NO at S1107, S1108, S1110, and S1111 are defined as a third arrangement region.

In enlargement processing, it is the image reference point arrangement region that is enlarged. The method of FIG. 11 includes four arrangement region enlargement processes: four-corner/rectangle (S1103), side (S1104), straight line (S1110), and point (S1111). In step S1103, four-corner arrangement region enlargement processing is performed. In step S1104, side arrangement region enlargement processing is performed. Then, the processing proceeds to step S1105 from step S1103 or step S1104.

Figure 12A:
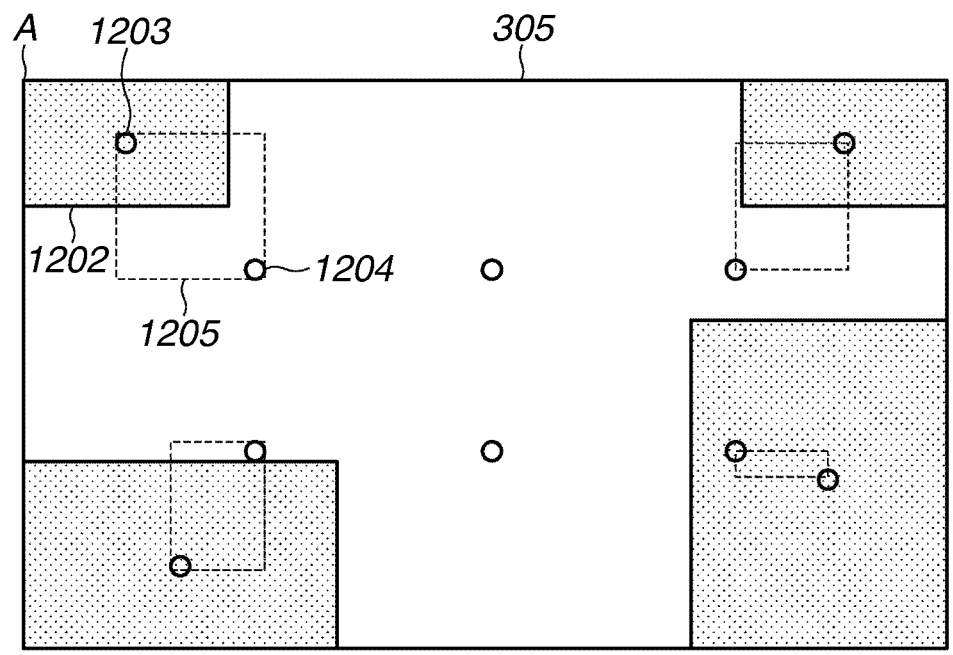
FIGS. 12A and 12B illustrate four-corner arrangement region enlargement processing according to the first exemplary embodiment.
Figure 12B:
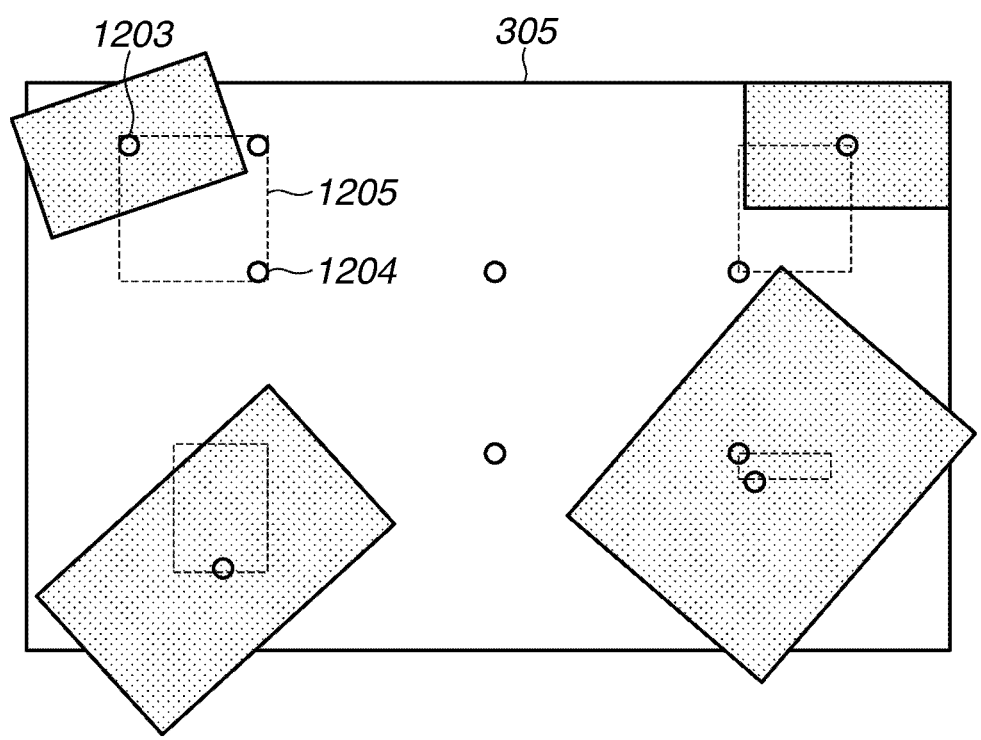

The four-corner arrangement region enlargement processing of step S1103 will be described with reference to FIG. 12A and FIG. 12B. As a rectangle, the collage region 305 in FIG. 12A has four corners. Also, in the example, the image 1202 having an image reference point 1203 was associated with a region reference point 1204 at step S502. As illustrated in FIG. 12A, the image 1202 is inscribed as a target image at the corner of the collage region 305 that is closest to the region reference point 1204. Here, the corner A of FIG. 12A closest to the region reference point 1204 so that the image 1202 is inscribed in the corner A. In this case, a first arrangement region 1205 is defined by the rectangle having a straight line as a diagonal line associating the image reference point 1203 with the region reference point 1204. Similarly, when each target image is arranged at another region reference point, the first arrangement region of each image is defined as the rectangle including, as a diagonal line, a straight line associating the region reference point with the image reference point when the target image is inscribed at the corner of the collage region 305 that is closest to the region reference point associated with the image. As described above, based on the region reference point and the image reference point when the target image is arranged at a most edge portion of the collage region 305, the arrangement region is determined. When the image 1202 is inscribed as a target image at the corner A, the position of the image reference point 1203 varies depending on the size of the image 1202. For example, when the target image is large, the image reference point will be positioned closer to a region reference point side, compared with when the image is small. Therefore, when the target image is large, the rectangle, serving as the arrangement region and including, as the diagonal line, the line associating the image reference point with the region reference point is smaller.

According to an embodiment, when the image object 306 (image) 306 extends outside of the collage region 305, the portion of the image 306 extending outside of the collage region 305 is not rendered. When the image reference point is disposed in the first arrangement region, if a rotation angle of the image is 0, the image does not extend outside of the collage region 305. On the other hand, as illustrated in FIG. 12B, if the image disposed at the corner of the collage region 305 is rotated to where its direction is changed, a part of the image extends outside of the collage region 305. However, at lease, the image 1202 whose image reference point 1203 is disposed in the first arrangement region 1205 does not extend outside of the first arrangement region 1205 when the image rotates at an angle of 0 degrees. Further, even if the image is rotated as in FIG. 12B, the image reference point 1203 and that portion of the image 1202 in the vicinity of image reference point 1203 do not extend outside of the collage region 305. Therefore, by setting at step S500 an essential portion of the image, for example the center of the image, as the image reference point, a desired portion of the image can be securely disposed within the collage region 305.

In step S1104, side arrangement region enlargement processing is performed. Then, the processing proceeds to step S1105.

Figure 13:
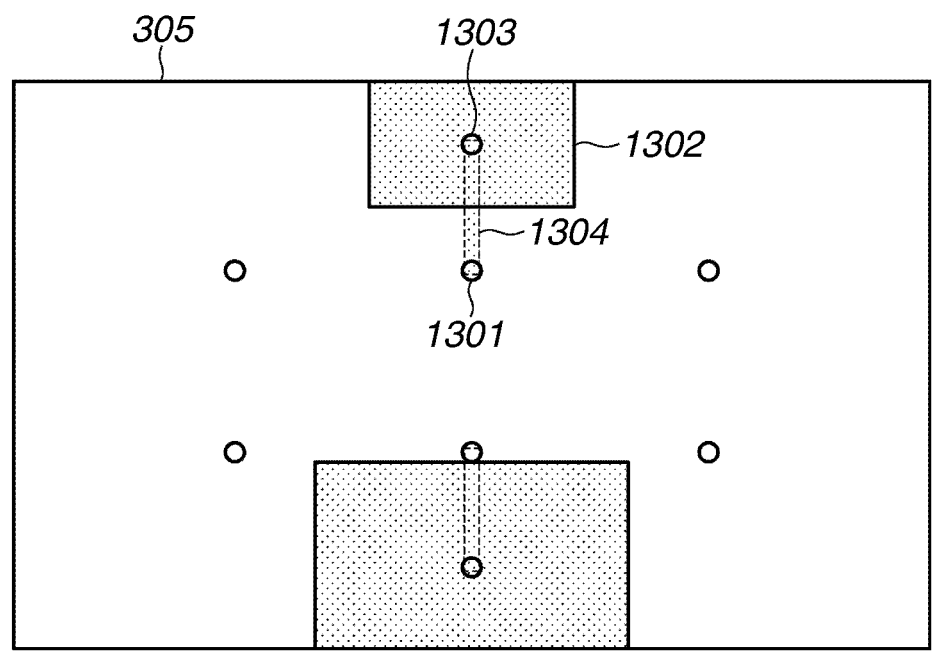
FIG. 13 illustrates side arrangement region enlargement processing according to the first exemplary embodiment.

The side arrangement region enlargement processing of step S1104 will be described with reference to FIG. 13. As illustrated in FIG. 13, an image 1302 is inscribed in a side of the collage region 305 that is closest to a region reference point 1301. Here, a first arrangement region 1304 is defined from the on-line of a straight line associating an image reference point 1303 with the region reference point 1301. Similarly, when another target image is arranged on another region reference point, the arrangement region of the target image is defined from the on-line of the straight line associating the region reference point with the image reference point when the target image is inscribed on the side of the collage region 305 that is closest to the region reference point associated with the image. As described above, based on the region reference point and the image reference point when the image is arranged at the most edge portion of the collage region 305, the arrangement region is determined. When the side of the collage region 305 and the side of the image 1202, as a target, coincide with each other, the position of the image reference point 1303 varies depending on the size of the image 1302. For example, when the target image is large, the image reference point is disposed closer to the region reference point side, compared with location of the image reference point when the target image is small. Therefore, when the target image is large, the straight line associating the image reference point with the region reference point is shorter.

In this processing of step S1104, similar to the four-corner arrangement region enlargement processing of step S1103, when the image reference point is disposed in the first arrangement region, if the angle is 0, the image does not extend outside of the collage region 305. Further, even if the image is rotated, the image reference point and the vicinity thereof do not extend outside of the collage region 305. Therefore, by defining at step S500 the essential portion of the image, for example the center of the image, as the image reference point, the desired portion of the image can be securely disposed within the collage region 305.

In step S1105, it is determined whether an enlargement direction of the first arrangement region, enlarged by the four-corner arrangement region enlargement processing of step S1103 or the side arrangement region enlargement processing of step S1104, was appropriate. The "enlargement direction is appropriate" means that the region was enlarged in a preferable direction. For example, it refers to a case where the first arrangement region, enlarged by the four-corner arrangement region enlargement processing or the side arrangement region enlargement processing, is not set at an edge portion side of the collage region 305 but is set at another region reference point side. When it is not appropriate (NO in step S1105), the processing proceeds to step S1106. When it is appropriate (YES in step S1105), the processing proceeds to step S1107.

In step S1106, the arrangement region reduction processing is performed. Subsequently, the processing proceeds to step S1107.

The arrangement region reduction processing will be described with reference to FIGS. 14A, 14B, 14C, and 14D. FIG. 14A illustrates a case where the first arrangement region 1405 is enlarged in an unpreferable direction by the four-corner arrangement region enlargement processing. As illustrated in FIG. 14A, an image reference point 1403 is not disposed within a rectangle 1401 that includes a diagonal line connecting a region reference point 1404 with the corner A of the collage region 305. In this case, if the image 1402 is rotated at step S505 after the position of the image reference point of the small image is randomly disposed at step S504 from its position in FIG. 14A, within its image reference point arrangement region, to the position illustrated in FIG. 14B within its image reference point arrangement region, the large image 1402 is overlapped with another image by a large area as illustrated in FIG. 14B. When the large image 1402 is disposed at a portion other than a region reference point 1404 in the first arrangement region 1405, in other words, the image reference point 1403 is disposed at an another region reference point side, the probability of the overlapping of the large image 1402 with the image associated with the another region reference point (and the area when overlapped) is increased. As illustrated in FIG. 14B, a small image may be entirely hidden by the large image 1402. As described above, when the large image 1402 and the small image are overlapped with each other, the large image 1402 may not be greatly affected but the small image is greatly affected.

In FIG. 14A, the image reference point 1403 is not disposed within the rectangle 1401 that includes a diagonal line connecting a region reference point 1404 with the corner A of the collage region 305. In step S1106 of the present exemplary embodiment, the first arrangement region 1405 enlarged to the another region reference point side is reduced to be adjusted to a new arrangement region by the arrangement region reduction processing. For example, as illustrated in FIG. 14A, when the arrangement region was enlarged at step S1103 in the unpreferable direction of a Y-axis direction, in other words, when the arrangement region was enlarged to the another reference point side in the Y-axis direction, the first arrangement region 1405 is reduced in step S1106 to have the same Y coordinate as that of the region reference point 1404 as illustrated in FIG. 14C. The first arrangement region 1405 is reduced most in the Y-axis direction to become a straight line in the X-axis direction. In a case where the arrangement region was enlarged in the unpreferable direction of an X-axis direction, in other words, when the arrangement region is enlarged to the another region reference point side in the X-axis direction, the first arrangement region is reduced at step S1106 to have the same X coordinate as that of the region reference point. Also in this case, the first arrangement region is reduced most in the X-axis direction to become a straight line. Further, in a case where the arrangement region was enlarged in the unpreferable direction of both the X axis and Y axis directions, the first arrangement region may be reduced at step S1106 in both the X-axis and Y-axis directions so that the arrangement region becomes the same point as the region reference point. A region defined by the above-described arrangement region reduction processing of step S1106 is defined as a second arrangement region. The image reference point is disposed in the second arrangement region, set as described above, to reduce the overlapping of adjacent images as illustrated in FIG. 14D.

The case is described, with reference to FIGS. 14A, 14B, 14C, and 14D, where the first arrangement region was enlarged in the unpreferable direction by the four-corner arrangement region enlargement processing of step S1103. Further, in a case where the first arrangement region is enlarged in the unpreferable direction by the side arrangement region enlargement processing of step S1104, the processing is also performed similarly. When the position of the image reference point of the image, at a time when the image, associated with the region reference point other than a top of the collage region 305 rectangle by the side arrangement region enlargement processing, is inscribed on a side close to the region reference point in the collage region 305, is disposed at a portion other than a portion that includes a straight line vertically connecting the region reference point with the side of the collage region 305, the arrangement region reduction processing of step S1106 is performed. More specifically, if the arrangement region is enlarged to another region reference point side in the Y-axis direction, the first arrangement region is reduced to have the same Y coordinate as that of the region reference point. A region defined by the above-described arrangement region reduction processing is defined as a second arrangement region. The image reference point is disposed within the second arrangement region set as described above to reduce the overlapping of adjacent image.

In step S1107, it is determined whether there is a region reference point, that is not associated with an image, positioned next to a region reference point associated with the target image. In other words, as described in FIG. 11 step S1107, is there a region reference point that is not in use and is adjacent to a region reference point that is in use.

Figure 15A:
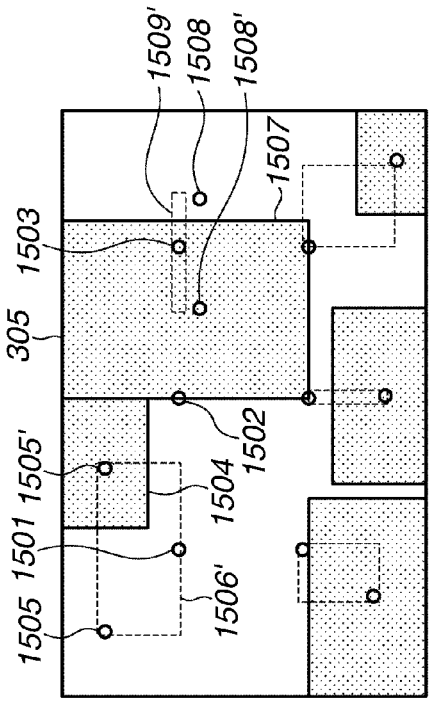
FIGS. 15A, 15B, and 15C illustrate arrangement region re-enlargement processing in an unused area according to the first exemplary embodiment.

Determination of step S1107 on whether there is the region reference point will be described with reference to FIG. 15A. As an example according to the present exemplary embodiment, when five photographs are disposed as images, six region reference points are disposed, as in FIG. 9, by the region reference point arrangement pattern determination processing of step S502. As illustrated in FIG. 15A, an arrangement region 1506 is generated by the step S1103 four-corner arrangement region enlargement processing for an image 1504. More specifically, the arrangement region 1506 is generated based on a region reference point 1501 and an image reference point 1505 when an image 1504, associated with the region reference point 1501, is inscribed in a top-left portion of the collage region 305. Further, when an image 1507, associated with a region reference point 1503, is inscribed in a top-right portion of the collage region 305, the arrangement region 1509 subsequently is set to a straight line 1509' by the arrangement region reduction processing of step S1106 since, as illustrated in FIG. 15A, the Y coordinate of an image reference point 1508 is closer to another region reference point side than the Y coordinate of the region reference point 1503 is. As illustrated in FIG. 15A, no image is associated with a region reference point 1502 between the region reference point 1501 and the region reference point 1503. Thus, the determination of step S1107 is true (YES in step S1107). In this case, the processing proceeds from step S1107 to step S1108.

In step S1108, a region reference point, not associated with an image, is positioned next to a region reference point associated with an image, the arrangement region re-enlargement processing is performed on an unused area.

Figure 15B:
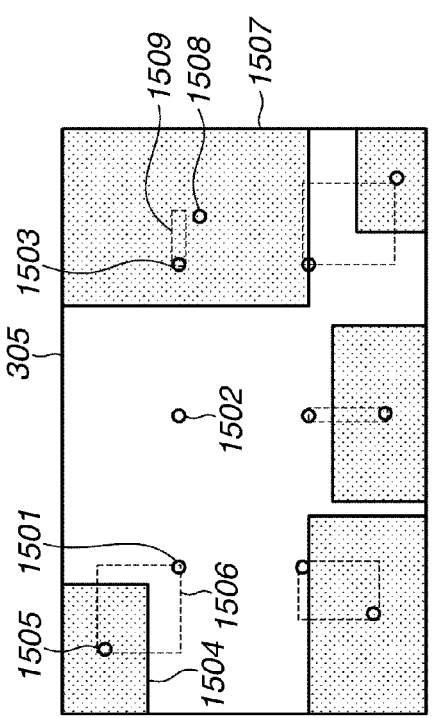

The arrangement region re-enlargement processing in step S1108 will be described with reference to FIG. 15B. As illustrated in FIG. 15B, the region reference point 1502 is not associated with an image in the X-axis direction of the region reference point 1501. Also, the region reference point 1502 is positioned next to the region reference point 1501 associated with the image 1504. Here, the arrangement region 1506 of the image 1504 associated with the region reference point 1501 is enlarged. To increase the size of the arrangement region 1506, the image 1504 inscribed in a top-left portion of the collage region 305 in FIG. 15A is moved so that, as in FIG. 15B, the side of the image 1504, that faces the region reference point 1502, has the same X coordinate as that of the region reference point 1502. Before the move, the image reference point of the image 1504 was the image reference point 1505. After the move, the image reference point 1505' is defined as the image reference point of the image 1504. As a result of the move, the arrangement region 1506 is enlarged to a position of the image reference point 1505' in the X-axis direction, which is defined as a third arrangement region 1506'. In other words, the arrangement region 1506' of the image 1504 is enlarged in a direction to the region reference point 1502 by an amount of a numeral value acquired by subtracting a half value of a width (width in the X direction) of the image 1504 from the difference between the coordinate of the region reference point 1501 and the coordinate of the region reference point 1502 in the collage region 305. The arrangement region 1506' of the image 1504 is considered enlarged, rather than re-enlarged, since the enlargement direction was not incorrect (NO at S1105) and arrangement region reduction processing at step S1106 was not performed.

Further, when an arrangement region that has been already set is a straight line, the processing is similarly performed. In other words, as illustrated in FIG. 15A, the region reference point 1502 is not associated with an image in the X-axis direction of the region reference point 1503. Also, the region reference point 1502 is positioned next to the region reference point 1503 associated with the image 1507. Here, as illustrated in FIG. 15B, the arrangement region 1509 of the image 1507 associated with the region reference point 1503 is enlarged. The image 1507 is moved so that the side of the image 1507, on the region reference point 1502 side, has the same X coordinate as that of the region reference point 1502. After the move, the image reference point 1508' is defined as the image reference point of the image 1507. The arrangement region 1509 is enlarged to a position of the image reference point 1508' in the X-axis direction, which is defined as a third arrangement region 1509'.

A case where there is a region reference point associated with no image in the X-axis direction is described above, and further when there is one in the Y-axis direction, the processing may also be performed similarly. In other words, the arrangement region may be enlarged in the Y-axis direction up to a predetermined position, which is defined as the third arrangement region.

Figure 15C:
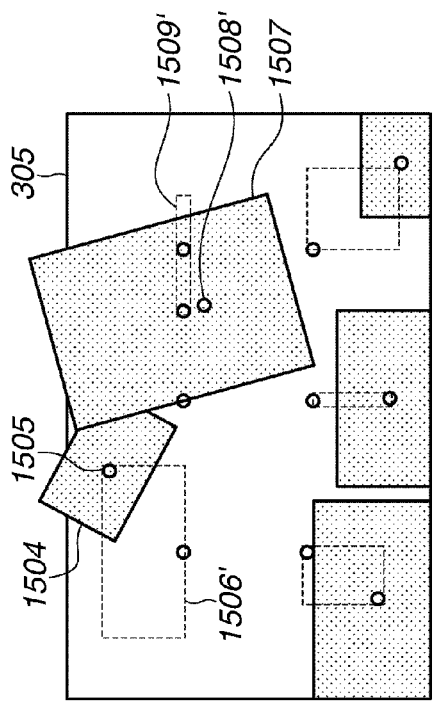

By the arrangement region re-enlargement processing of step S1108 according to the present exemplary embodiment, a collage image including no large blank area can be generated. Further, at least when the image is not rotated, the images rarely overlapped with each other. Furthermore, after performing the arrangement region re-enlargement processing, the overlapped area can be reduced, even if the image 1504 is rotated to be overlapped with another image 1507 as illustrated in FIG. 15C.

When it is determined that three to six images are not arranged (NO in step S1101), the processing of FIG. 11 proceeds to step S1109. In step S1109, it is determined whether the region reference points disposed in the collage region 305 are disposed in line. It is determined whether, when a plurality of region reference points disposed in the collage region 305 are connected with one another, the straight line parallel to the side of the collage region 305 is obtained. According to the present exemplary embodiment, it is determined at step S1109 whether the total number of the images is two. According to the present exemplary embodiment, as illustrated in FIG. 9, when two images are to be arranged, the region reference points are disposed in line. When the total number of the images is two (YES in step S1109), the processing proceeds to step S1110. When the total number of the images is not two, i.e., it is one (NO in step S1109), the processing proceeds to step S1111.

In step S1110, the straight line arrangement region enlargement processing is performed. The straight line arrangement region enlargement processing will be described with reference to FIG. 16.

Figure 16:
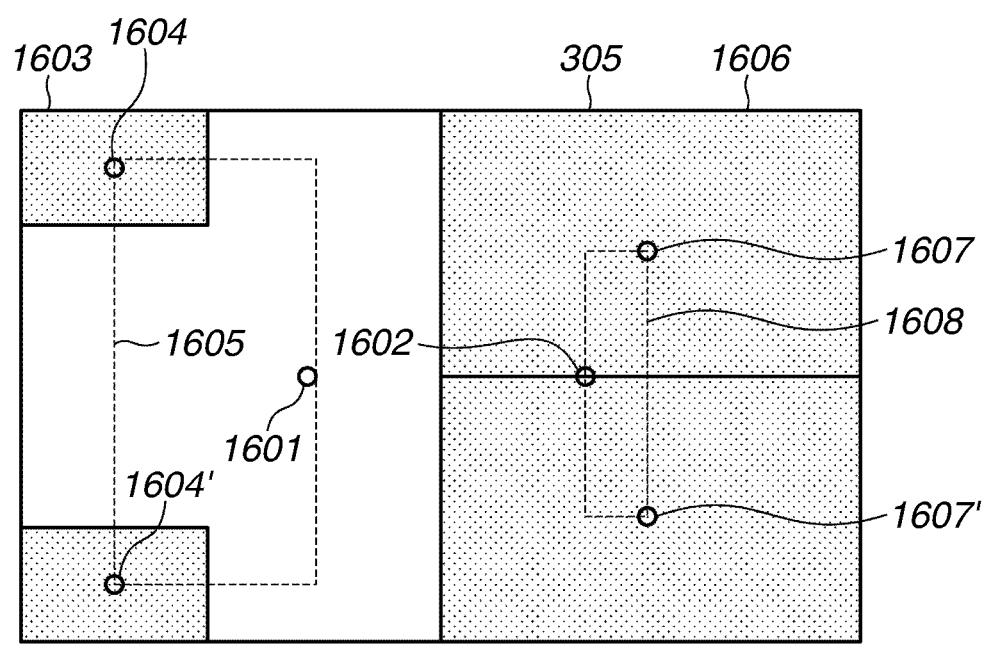
FIG. 16 illustrates straight-line arrangement region enlargement processing according to the first exemplary embodiment.

As illustrated in FIG. 16, an image reference point 1604 is obtained when an image 1603 associated with a region reference point 1601 is inscribed in a top-left portion of the collage region 305 and an image reference point 1604' is obtained when the image 1603 is inscribed in a bottom-left portion of the collage region 305. A straight line connecting an image reference point 1604 with an image reference point 1604' is set as one side of a rectangle, and a side passing a region reference point 1601 and being parallel to the straight line connecting the image reference point 1604 with the image reference point 1604' is set as a side of the rectangle opposing the one side. A first arrangement region 1605 is defined by the rectangle formed of the two sides, a side passing the image reference point 1604 and being orthogonal to the sides described above, and a side passing the image reference point 1604' and being orthogonal thereto. A position of the image reference point when the image 1603, as a target, is inscribed at a corner of the collage region 305 varies depending on the size of the image 1603. For example, when the image is large, compared with the small image, the image reference point is positioned closer to the region reference point side. Thus, the straight line connecting the image reference point with the region reference point is shorter when the image relatively is large.

When two images are arranged, according to the size determination table illustrated in FIG. 6, the size of the image is defined up to maximum 50% of the collage region 305. Further, according to the present exemplary embodiment, a center of the image is defined as the image reference point of the image at step S500 of FIG. 5. Thus, for example, when an image 1606 having the size of maximum 50% is inscribed in the top-right portion and a bottom-right portion of the collage region 305, the X coordinates of the image reference points 1607 and 1607' are positioned at 25% of the collage region 305 from a right frame thereof. Since the region reference point 1602 is positioned in the X direction at 33% of the collage region 305 from the right frame thereof, the arrangement region reduction processing of step S1106 does not need to be performed taking another region reference point into account. Further, since the image is always arranged at the adjacent region reference point, the arrangement region re-enlargement processing of step S1108 is not required either. Therefore, the arrangement region defined by the straight line arrangement region enlargement processing of step S1110 is defined as the third arrangement region as it is.

Figure 17:
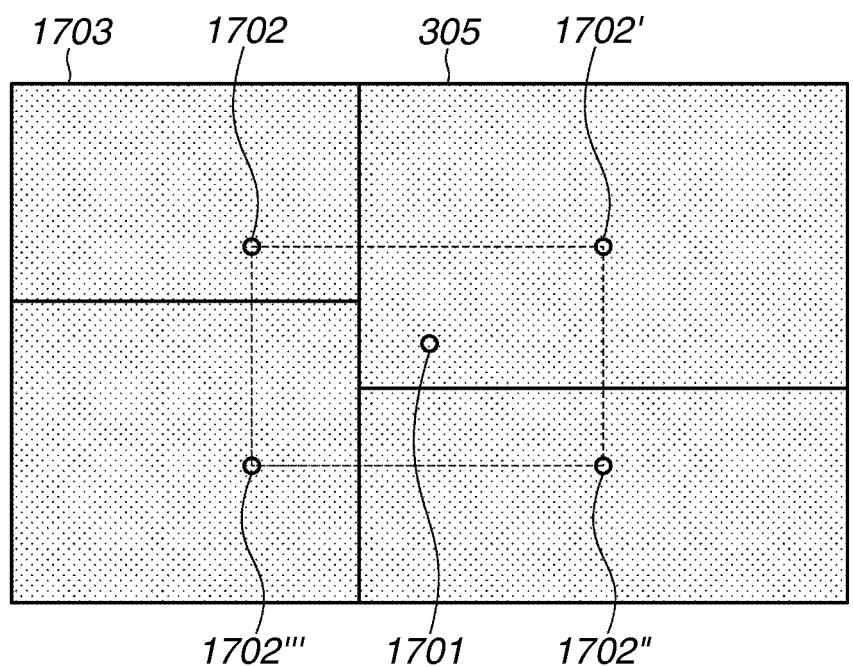
FIG. 17 illustrates point arrangement region enlargement processing according to the first exemplary embodiment.

In step S1111, point arrangement region enlargement processing is performed. The point arrangement region enlargement processing will be described with reference to FIG. 17. As illustrated in FIG. 17 (and FIG. 9), when one image is arranged, one region reference point 1701 is disposed. When an image 1703 associated with the region reference point 1701 is inscribed at the corner of the collage region 305, a rectangle having top corners of image reference points 1702, 1702', 1702'', and 1702''' becomes the arrangement region. A position of the image reference point when an image 1703, as a target, is inscribed at the corner of the collage region 305 varies depending on the size of the image 1703. For example, when the image is large, compared with the small image, the image reference point is positioned closer to the region reference point side. Thus, the straight line connecting the image reference point with the region reference point is shorter when the image relatively is large.

Further, when one image is arranged, since there is no adjacent region reference point, the arrangement region reduction processing and the arrangement region re-enlargement processing are not required. The arrangement region defined by the point arrangement region enlargement processing of step S1111 is defined as the third arrangement region as it is.

FIG. 11 is a flowchart for generating the image reference point arrangement region at step S503 of FIG. 5. In FIG. 11, the third arrangement region set in steps S1101 to S1111, such as in steps NO at S1107, S1108, S1110, or S1111, becomes the image reference point arrangement region within which the image reference point can be finally disposed. The processing in steps S1101 to S1111 is sequentially performed on all images to determine the image reference point arrangement region for each image.

As described above, after the image reference point arrangement region is generated in step S503, then, in step S504, the position where the image reference point is to be disposed in the image reference point arrangement region is determined randomly using the random numbers by the reference point position determination processing. With this processing, values of the IDs 401 and 402 are determined. Then, in step S505, the angel of the image is randomly determined using random numbers, for example, from within the angle of ±35 degrees by angle determination processing for determining the angle of the image. The value at that time is defined as the value of the ID 407.

According to the present exemplary embodiment, based on the size of the image, when the image is arranged in the collage region 305, and the position of the region reference point associated with the image, the region where the image reference point can be disposed is determined and the image reference point is disposed within the region where it can be disposed. With this processing, the images of various arrangement patterns having preferable appearances can be obtained.

Further, according to the present exemplary embodiment, according to the region reference point arrangement pattern table of FIG. 9, a relationship with other images is taken into account and the image reference point arrangement region of each image is generated while the arrangement pattern of the region reference points is determined so that the images can be arranged at positions having a certain interval between the images. With this processing, the area where the image reference point can be disposed, in other words, the image reference point arrangement region can be determined while the overlapping of the images is reduced with no large blank area included. Further, the image reference point is randomly disposed in the image reference point arrangement region to realize the shuffle generating different results each time. Therefore, according to the present exemplary embodiment, the collage application by which the different results can be obtained each time, can be realized.

As described above, according to the present exemplary embodiment, the image reference point arrangement region is determined while the relationship with information about other images is taken into account and the position where the image is arranged is calculated and adjusted so that the image can have better appearances. With this processing, the image reference point of the image is randomly disposed within the image reference point arrangement region so that the image can have better appearances, and further, the different collage image can be obtained each time the images are shuffled. In other words, according to the present exemplary embodiment, the freedom of the arrangement position of the image can be improved.

According to a second exemplary embodiment, since processing other than the method for determining the image reference point is performed in a similar manner to that of the first exemplary embodiment, configurations similar thereto will not be repeatedly described.

The step S500 method for determining the image reference point of the present exemplary embodiment will be described with reference to FIGS. 18A, 18B, 19A, 19B, and 20.

Figure 18A:
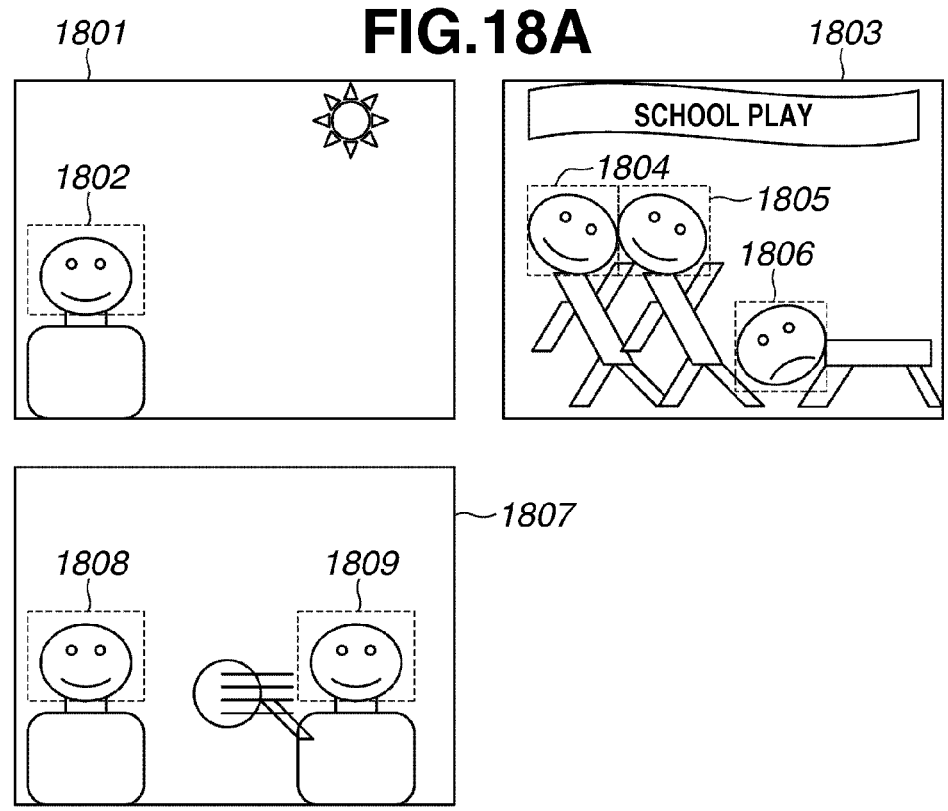
FIGS. 18A and 18B illustrate a determination method of an image reference point according to a second exemplary embodiment of the present invention.
Figure 18B:
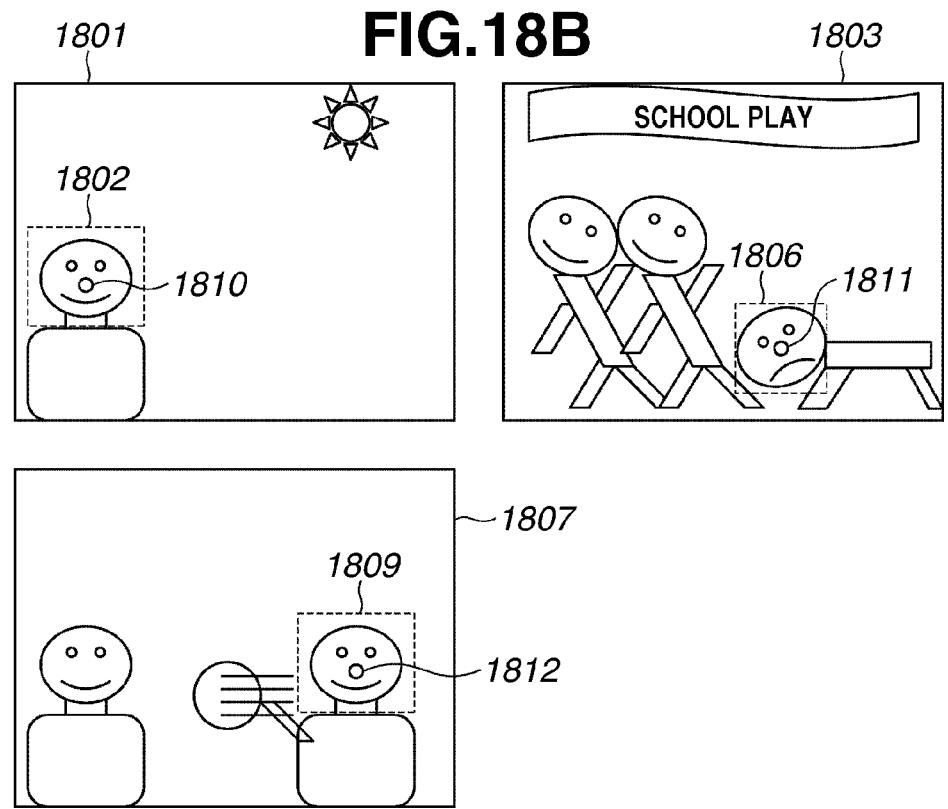

FIGS. 18A and 18B illustrate images used for the present exemplary embodiment. FIG. 18A illustrates a photo image including position information on a person's face.

An image 1801 includes one person, and a face region 1802 indicating a face is specified. Further, the name of the person of the face is defined as image information. According to the present exemplary embodiment, the person's name is defined as the image information, however, in place of the person's name, for example, the name of a user who is to make the collage image may be defined as the image information.

An image 1803 is a photo image of a school play of a user's child. In this case, in addition to a face region 1806 indicating a face of the user's child, face regions 1804 and 1805 of child's friends are defined. The person's name of the face is defined for each face region.

Further, an image 1807 is an image of the user and the user's child playing catch. In this case, a face region 1808 indicating a user's face and a face region 1809 indicating the face of the user's child are defined, and the person's name is defined as the image information for each face region.

The image information described above is, for example, read out from a social network site via a network unit 106 and stored in the storage unit 103.

Figure 20:
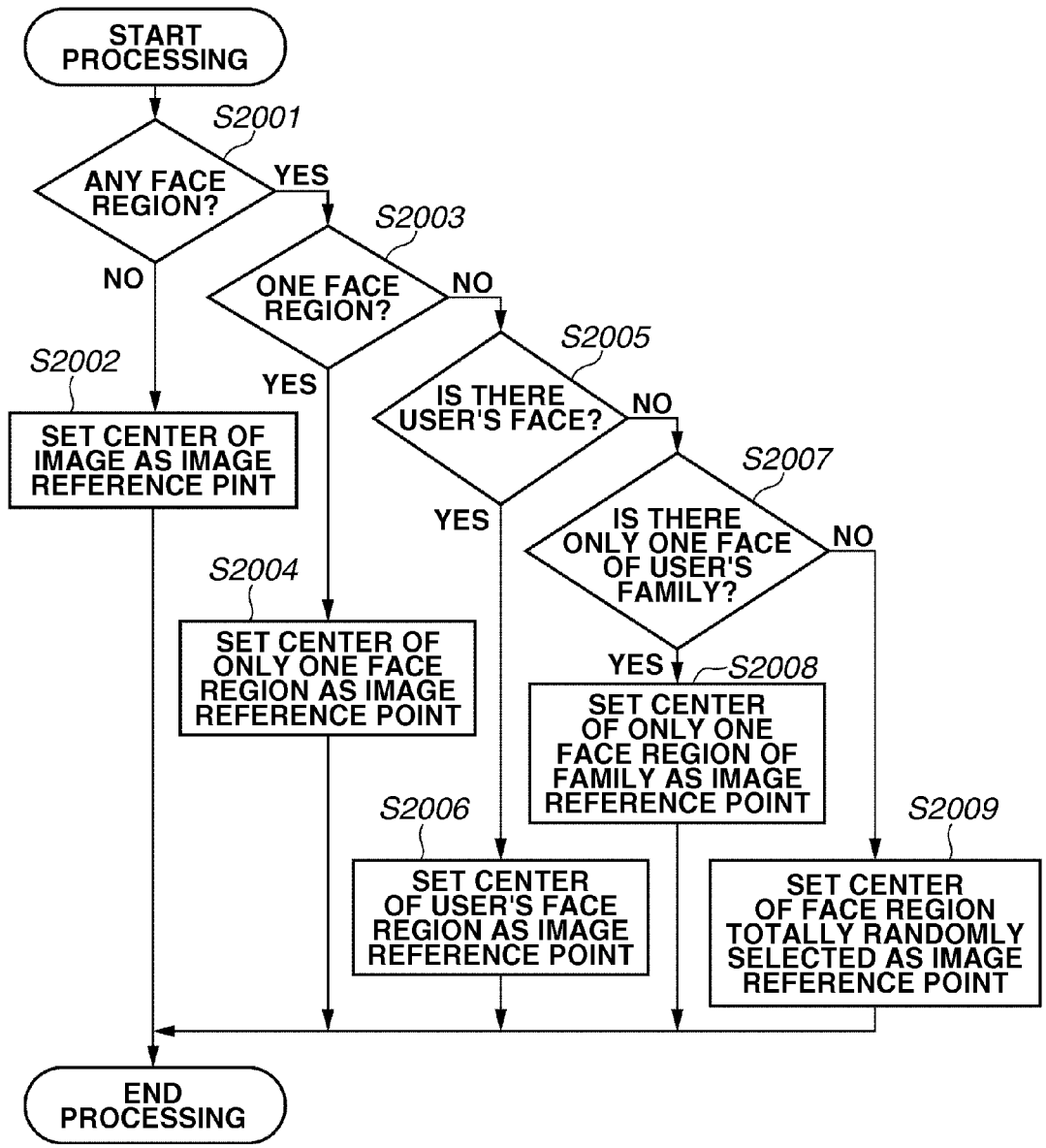
FIG. 20 is a flowchart illustrating determination processing of the image reference point according to the second exemplary embodiment.

FIG. 20 is a flowchart illustrating determination processing of the image reference point according to the present exemplary embodiment. The processing is performed such that a program stored in the hard disk and so on is loaded to the RAM 102 to be executed by the CPU 101.

In step S2001, it is determined whether there is any face region in the target image. In other words, it is determined whether any face region is set for the target image. When there is a face region (YES in step S2001), the processing proceeds to step S2003. When there is no face region, in other words, when a face region is not set (NO in step S2001), the processing proceeds to step S2002.

In step S2002, the center of the image is determined as the image reference point, and then, the processing ends.

In step S2003, it is determined whether one face region is included in the image. When one face region is included (YES in step S2003), the processing proceeds to step S2004. When two or more faces are included (NO in step S2003), the processing proceeds to step S2005.

In step S2004, when only one face region is included, the center of the only one face image is determined as the image reference point, and then, the processing ends.

In step S2005, it is determined whether the use's face is included in a plurality of face regions in the image. When the user's face is included (YES in step S2005), the processing proceeds to step S2006. When the user's face is not included (NO in step S2005), the processing proceeds to step S2007.

In step S2006, the center of the image of the user's face is determined as the image reference point, and then, the processing ends.

In step S2007, it is determined whether only one family member's face of the user's family is included. In other words, when the face region of the user is not included in the plurality of face regions, but only one face region of the user's family is included (YES in step S2007), the processing proceeds to step S2008. When two or more face regions of the user's family are included or no face region of the user's family is included (NO in step S2007), the processing proceeds to step S2009.

In step S2008, the center of the only one face region of the user's family is determined as the image reference point, and then, the processing ends.

In step S2009, of the plurality of the face regions, the center of the face region randomly determined is determined as the image reference point, and then, the processing ends.

FIG. 18B illustrates an example of the image reference point defined in the flowchart illustrated in FIG. 20. As illustrated in FIG. 18B, in the image 1801 including one person, the center of the face region 1802 of the person is determined as an image reference point 1810. On the other hand, in the image 1803 including the user's child and the child's friends, the center of the face region 1806 of the user's child is determined as an image reference point 1811. In an image 1807 including the user and the user's child, the center of the face region 1809 of the user is determined as an image reference point 1812. Using this image reference point, by a similar method to that of the first exemplary embodiment, the image reference point arrangement region may be determined. In other words, by the same method as that of the first exemplary embodiment, other than using the image reference point, the collage image can be generated.

In step S1107, it is determined whether one face region of the user's family is included by the determination processing of the image reference point described above. At that time, when it is determined whether the user's family is included, for example, a user's name and a family member's name of the user, which are associated with each other and previously stored in the storage unit 103 or an external storage unit, may be referred to.

By the image reference point determination processing described above, when the face region is included in the image, the center of the face region may be defined as the image reference point, and when the plurality of face regions are included in the image, the center of the face region including the user or the user's family is preferentially determined as the image reference point. With this processing, the collage image in which the face region is more securely disposed within the collage region 305 can be obtained. Further, the collage image in which the face of the user or the user's family is more securely disposed within the collage region 305 can be obtained.

Figure 19A:
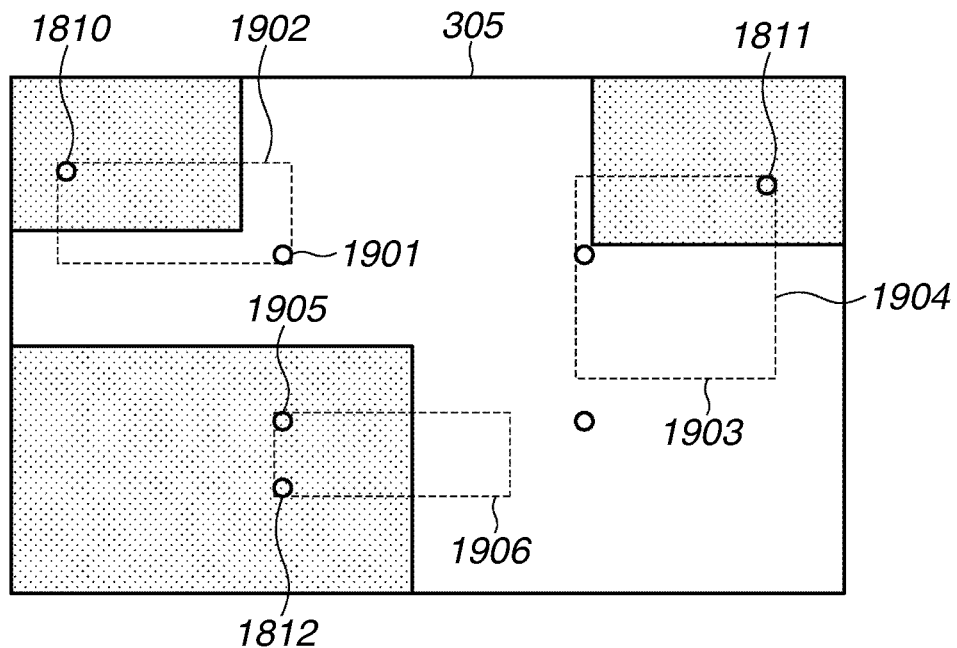
FIGS. 19A and 19B illustrate determination of an image reference point arrangement region according to the second exemplary embodiment.
Figure 19B:
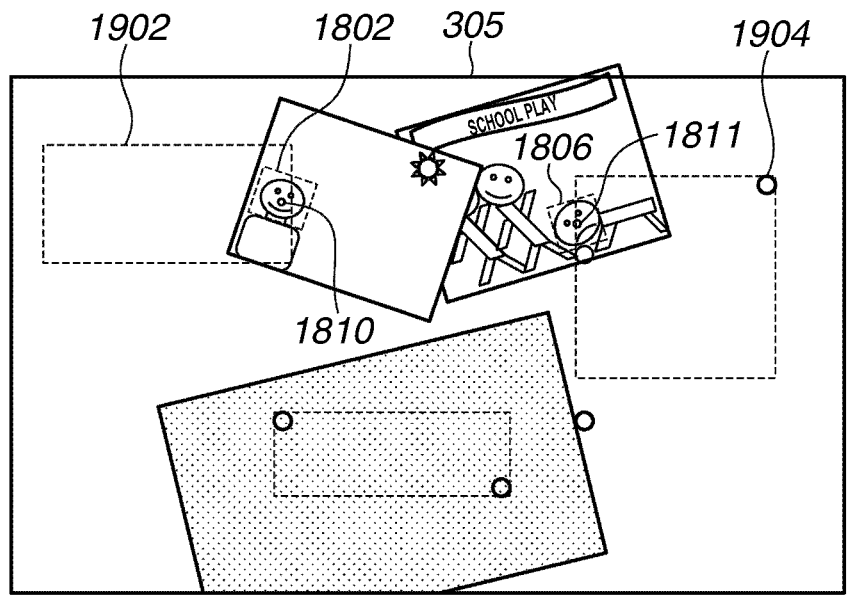

The step S503 determination processing of the image reference point arrangement region according to the present exemplary embodiment will be briefly described with reference to FIGS. 19A and 19B. FIGS. 19A and 19B illustrates the determination processing of the image reference point arrangement region including the face region as the image reference point. According to the present exemplary embodiment, since three images are included, based on the reference point arrangement pattern illustrated in FIG. 9, four region reference points are defined. Of the four region reference points, for example, when the image reference point 1810, associated with a region reference point 1901 is disposed in a top-left portion, an image reference point arrangement region 1902 is determined at step S503 by the similar processing to that of the first exemplary embodiment. Further, also when the image reference point 1811, associated with a region reference point 1903, is disposed in a top-right portion, an image reference point arrangement region 1904 is determined at step S503 by the similar processing to that of the first exemplary embodiment. More specifically, by performing the arrangement region re-enlargement processing on the unused area described in the first exemplary embodiment, the image reference point arrangement region is downwardly extended. Also, when the image reference point 1812, associated with a region reference point 1905, is disposed in a bottom-left portion, an image reference point arrangement region 1906 is determined at step S503 by the similar processing to that of the first exemplary embodiment. Also, in this case, by performing the arrangement region re-enlargement processing on the unused area described in the first exemplary embodiment, the image reference point arrangement region 1906 is extended to the right.

As described in the present exemplary embodiment, when the image reference point is not the center of the image, the images can be overlapped with each other with more area than when the center of the image is the image reference point. However, since the image reference point is disposed at the center of the face image, at least, the probability of the target face image (the user or the user's family member according to the present exemplary embodiment) being hidden at a back of another image is reduced. For example, as illustrated in FIG. 19B, when the images are disposed closest to each other, the friend's face 1804 in the image 1803 can be hidden, however, the child's face 1806 disposed about the center of the image reference point 1811 disposed within the image reference point arrangement region 1904 is less likely to be hidden. More specifically, when the image reference point 1810 is disposed on a most right side of the image reference point arrangement region 1902, and when the image reference point 1811 is disposed on a most left side of the image reference point arrangement region 1904, the child's face 1806 disposed about the image reference point 1811 disposed within the image reference point arrangement region 1904 is less likely to be hidden.

As described above, according to the present exemplary embodiment, the center of the face is determined as the image reference point so that at least the face is less likely to be hidden in the back of another image. In the collage image, a part of the images may overlap with each other. However, the images can be arranged in such a manner that a specific person, according to the present exemplary embodiment, the user (YES at step S2005) or the user's family member (YES at step S2007) is not hidden. On the social network site where users interact with each other over an internet, the social network site, in many cases, has functions to store the user's photographs over the network, and further, the position and the name of the face on the photographs can be added to data of the photographs and stored. In such a case, the face's position can be specified by acquiring the data of the face's position and the person's name, and thus the collage can be generated with no faces overlapped with each other.

Similar to the first exemplary embodiment, according to the present exemplary embodiment, based on the size of the image, when the image is arranged in the collage region 305, and the position of the region reference point associated with the image, the region where the image reference point can be disposed is determined, and the image reference point is disposed within the region where it can be disposed. With this processing, the image reference point of the image is randomly disposed within the image reference point arrangement region so that the image can have better appearance, and further, the different collage image can be obtained each time the images are shuffled. In other words, according to the present exemplary embodiment, the freedom of the arrangement position of the image can be improved.

The exemplary embodiments of the present invention are described above, and a basic configuration of the present invention is not limited to the exemplary embodiments described above.

According to the above-described exemplary embodiments, an example where one to six images are arranged in a predetermined region is described, and also when seven or more images are arranged, they may be arranged by a similar method. In other words, similar to the first and second exemplary embodiments, according to the number of the images to be arranged in the collage region 305, the number of region reference points is set and the subsequent processing may be performed.

According to the above-described exemplary embodiments, the arrangement pattern of the region reference point illustrated in FIG. 9 is used, however, the arrangement pattern of the region reference point is not limited thereto. For example, the number of region reference points may be set to be always the same as that of the images, or may be set to be always more than that of the images. Further, the position of the region reference point is not limited to the positions described above, and the region reference points may not be disposed at an equal interval.

According to the second exemplary embodiment, of the plurality of the face regions, determination on who's face region is to be the image reference point is automatically performed, however, the determination is not limited thereto. For example, the user may specify the specific person and the center of the face region of the specified person may be determined as the image reference point.

The determination processing of the image reference point according to the second exemplary embodiment determines whether the user's face is included and whether one face of the user's family member is included, however, the determination is not limited thereto, and for example, it may be determined only whether the user's face is included. Further, together with the determinations described above or in place of the determination of the user, whether the face of the user's friend is included may be determined, or whether a specific person's face is included may be also determined. When it is determined whether the face of the user's friend is included, for example, the user's name and a name of a user's friend, which are associated with each other and previously stored in the storage unit 103 or an external storage unit, may be referred to.

Further, according to the first exemplary embodiment, the center of the image is defined as the image reference point, and according to the second exemplary embodiment, the center of the face region is defined as the image reference point, however, the determination on the image reference point is not limited thereto. For example, in place of the face region, a center of a specific object, such as a famous building in the scenery and the like, may be defined as the image reference point. Furthermore, not the center of the face or the object, but a part indicating its feature, for example, eyes in the face and a summit of Mt. Fuji may be defined as the image reference point. With any of the above-described image reference points, a portion to be the image reference point and the image near the image reference point are less likely to be overlapped with another image to be hidden.

According to the first and second exemplary embodiments, the size of the image to be arranged is determined by the size determination processing, however, the size determination processing may not be performed. For example, the image may be arranged in the collage region 305 without changing the size of the original image, or the image may be trimmed into an appropriate size and then arranged in the collage region 305.

According to the exemplary embodiments described above, as illustrated in FIG. 10, the priority of the region reference point associated with, according to the first image, another image is changed, however, it may not be changed.

According to the above described exemplary embodiments, the association processing is performed and the image reference point arrangement region is generated in image size order beginning with the larger image, however, the present invention is not limited thereto. For example, the association processing may be performed and the image reference point arrangement region may be generated randomly on the image in any size. However, by performing the association processing and generating the image reference point arrangement processing in image size order from the larger image, the collage image including no large blank area can be generated while the overlapped area of the images is reduced Further, according to the above-described exemplary embodiments, the arrangement region reduction processing is performed, however, it may not be performed. If the arrangement region reduction processing is performed, the overlapped area of the images can be further reduced.

According to the above-described exemplary embodiments, the arrangement region re-enlargement processing is performed on the unused area, however, it may not be performed.

According to the above-described exemplary embodiments, in steps S503 to S505, S801, S802, S1004, S1008, and S1009, using the random numbers such as pseudorandom numbers, random arrangement and arrangement pattern are determined, however, the present invention is not limited thereto. For example, the arrangement and pattern may be determined according to a previously determined rule. By any method, by performing selection from among a plurality of options, various types of images can be obtained.

Furthermore, the collage application may add a frame for the purpose of decoration of the image to be arranged, and also add text for describing the image on the frame. For example, as illustrated in FIG. 21, a decorative frame 2101 is added to the image and a text box 2102 for displaying the description is also added. In such a case, the image reference point may be set not at the center of the image but a center 2103 of a region including the decorative frame 2101. As described above, by generating the image reference point arrangement region including the region of the decorative frame 2101, the probability of the decorative frame 2101 and the text box 2102 thereon being hidden by another image can be reduced.

According to the present exemplary embodiment, the image arrangement control apparatus capable of improving the freedom of an arrangement position of the image, the method thereof, and the program therefor can be realized.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of assigned computing systems, an optical disk (such as a compact disc (CD), digital versatile disc (DVD), or Blu-ray Disc (BD)™, a flash memory device, a memory card, and the like.

In addition, all the processes described above are not to be necessarily realized by software but a part of or all the processes may be realized by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153672, filed July 9, which is hereby incorporated by reference herein in its entirety.

What is claimed is:

1. An image arrangement apparatus comprising:
    an association unit configured to associate, for a plurality of images represented by image data, image data with an arrangement reference point through an image reference point of the image data, wherein a number of arrangement reference points disposed in a collage region is equal to or more than the number of images to be arranged in the collage region;
    a setting unit configured to set, in the collage region and for each image data, an image reference point arrangement region based on a size of the image represented by the image data associated with the arrangement reference point and based on a position of the arrangement reference point associated with the image reference point of the image data;
    a generation unit configured to generate a collage image of the plurality images for display on a display unit, wherein, for each of the plurality of images, the generation unit positions an image reference point of the image data within the image reference point arrangement region associated with the image data to arrange each image of the plurality of images in the collage region; and
    at least one processor, wherein the at least one processor implements the association unit, the setting unit, and the generation unit.

2. The image arrangement apparatus according to claim 1, further comprising a determination unit implemented by the at least one processor and configured to determine a size of each image data.

3. The image arrangement apparatus according to claim 2, wherein each image data includes an original size, and
    wherein the determination unit is configured to determine the size of an image data of each of the plurality of images so that an aspect ratio of the determined size is the same as an aspect ratio of the original size.

4. The image arrangement apparatus according to claim 2, wherein, in a case where it is determined that the number of images to be arranged in the collage region is two or more images, the association unit is configured to associate, in image size order beginning with a largest image, each image data with an arrangement reference point that is different from all other arrangement reference points disposed in the collage region.

5. The image arrangement apparatus according to claim 2, wherein, in a case where it is determined that the number of images to be arranged in the collage region is two or more images, the setting unit is configured to set image reference point arrangement regions in image size order beginning with the image reference point arrangement region associated with a largest image.

6. The image arrangement apparatus according to claim 2, wherein, in a case where it is determined that the number of images to be arranged in the collage region is two or more images, the association unit is configured to change a priority for associating an image reference point with an arrangement reference point from an equal priority for all arrangement reference points disposed in a collage region
wherein, in a case where the association unit associates an image data, that is a landscape image, with an arrangement reference point, the association unit is configured to lower the priority of the arrangement reference point disposed in a horizontal direction relative to the arrangement reference point associated with the image data, and
wherein, in a case where the association unit associates an image data, that is other than a landscape image, with an arrangement reference point, the association unit is configured to lower the priority of the arrangement reference point disposed in a vertical direction relative to the arrangement reference point associated with the image data.

7. The image arrangement apparatus according to claim 1, wherein, in a case where it is determined that the number of images to be arranged in the collage region is two or more images, the association unit is configured to set the arrangement reference points at equal intervals in the collage region.

8. The image arrangement apparatus according to claim 1, wherein, in a case where it is determined that the collage region is a rectangle and that a straight line, connecting a plurality of arrangement reference points disposed in the collage region, is parallel to a side of the collage region, the setting unit is configured to
set, as a candidate region of the image reference point arrangement region, a rectangle including a first straight line and a second straight line as two sides of the rectangle, wherein the first straight line connects, as a connected line, a first image reference point of the image data, inscribed at a first corner of the collage region, with a second image reference point of the image data, inscribed at a second corner of the collage region, wherein the second corner is opposite to the first corner in with respect to the connected line, and wherein the second straight line passes one of the an arrangement reference points and is parallel to the first straight line, and
set, based on the candidate region, the image reference point arrangement region.

9. The image arrangement apparatus according to claim 1, wherein, in a case where it is determined that the collage region is a rectangle and that one arrangement reference point is disposed in the collage region, the setting unit is configured to
set, as a candidate region of the image reference point arrangement region, a rectangle, wherein the image is inscribed at each of the four corners of the collage region and the rectangle includes the four image reference points of the image as corners of the rectangle, and
set, based on the candidate region, the image reference point arrangement region.

10. The image arrangement apparatus according to claim 1, wherein, in a case where it is determined that the collage region is a rectangle and that connecting a plurality of arrangement reference points disposed in the collage region forms a rectangle,
the setting unit is configured to
set, as a first candidate region of the image reference point arrangement region of a first image data associated with the an arrangement reference point corresponding to a corner of the rectangle, a first rectangle, wherein the first rectangle includes, as a diagonal line, a first straight line connecting a first arrangement reference point with a first image reference point of the first image data in a case of being inscribed at a first corner in the collage region, and
determine, based on the first candidate region, the image reference point arrangement region of the first image data, and
the setting unit is configured to
set, as a second candidate region of the image reference point arrangement region of a second image data associated with the arrangement reference point not corresponding to the corner of the rectangle, a second straight line, wherein the second straight line connects a second arrangement reference point with a second image reference point of the second image data in a case of being on a side of the collage region close to a second arrangement reference point, and
determine, based on the second candidate region, the image reference point arrangement region of the second image data.

11. The image arrangement apparatus according to claim 10,
wherein, in a case where it is determined that a position of the first image reference point is outside of a rectangle including, as a diagonal line, a straight line connecting the first arrangement reference point and a corner of the collage region, the setting unit is configured to
set a second candidate region by reducing the first candidate region to a straight line candidate region, and
determine, based on the straight line candidate region, the image reference point arrangement region of the first image data, and
wherein, in a case where it is determined that a position of the second image reference point is outside of a straight line perpendicularly connecting the second arrangement reference point to a side of the collage region, the setting unit is configured to
set a second candidate region by reducing the second candidate region to a point candidate region where the second image reference point and second arrangement reference point are at the same position, and
determine, based on the point candidate region, the image reference point arrangement region of the second image data.

12. The image arrangement apparatus according to claim 11, wherein in a case where it is determined that an arrangement reference point, that is not associated with an image data, is positioned next to an arrangement reference point associated, as an associated image data, with an image data, the setting unit is configured to set a third candidate region by extending the second candidate region towards the arrangement reference point that is not associated with an image data.

13. The image arrangement apparatus according to claim 12, wherein the setting unit is configured to extend the second candidate region towards the an arrangement reference point that is not associated with an image data by an amount of a value obtained by subtracting a half value of a width of the image data associated with the an arrangement reference point from a difference between a coordinate of the arrangement reference point associated with the image data and a coordinate of the arrangement reference point that is not associated with an image data.

14. The image arrangement apparatus according to claim 1, wherein the setting unit is configured to set a center of each image as the image reference point for that image.

15. The image arrangement apparatus according to claim 1, the setting unit is configured to set a center of an object in each image as the image reference point for that image.

16. The image arrangement apparatus according to claim 1, further comprising a direction change unit implemented by the at least one processor and configured to change a direction of an image arranged by the generation unit.

17. The image arrangement apparatus according to claim 1, wherein the setting unit configured to set an image reference point for each image data.

18. The image arrangement apparatus according to claim 1, wherein the plurality of images includes at least a picture, a photo, and a text, and the display unit is one of a display for a computer (PC) or a smart phone.

19. A method for an image arrangement apparatus, the method comprising:
   associating, for a plurality of images represented by image data, image data with an arrangement reference point through an image reference point of the image data, wherein a number of arrangement reference points disposed in a collage region is equal to or more than the number of images to be arranged in the collage region;
   setting, in the collage region and for each image data, an image reference point arrangement region based on a size of the image represented by the image data associated with the arrangement reference point and based on a position of the arrangement reference point associated with the image reference point of the image data;
   generating a collage image of the plurality images for display on a display unit, wherein, for each of the plurality of images, generating includes positioning an image reference point of the image data within the image reference point arrangement region associated with the image data to arrange each image of the plurality of images in the collage region.

20. The image arrangement apparatus according to claim 1, wherein the setting unit is configured to set an arrangement reference point so that a number of arrangement reference points set in the collage region is equal to or more than a number of images to be arranged in the collage region.

21. The method according to claim 19, further comprising setting an image reference point for each image data; and
   setting an arrangement reference point so that a number of arrangement reference points set in the collage region is equal to or more than a number of images to be arranged in the collage region.

22. A non-transitory computer-readable recording medium storing a program to cause an image arrangement apparatus to perform a method, the method comprising:
   associating, for a plurality of images represented by image data, image data with an arrangement reference point through an image reference point of the image data, wherein a number of arrangement reference points disposed in a display region is equal to or more than the number of images to be arranged in the collage region;
   setting, in the collage region and for each image data, an image reference point arrangement region based on a size of the image represented by the image data associated with the arrangement reference point and based on a position of the arrangement reference point associated with the image reference point of the image data;
   generating a collage image of the plurality images for display on a display unit, wherein, for each of the plurality of images, generating includes positioning an image reference point of the image data within the image reference point arrangement region associated with the image data to arrange each image of the plurality of images in the collage region.

* * * * *